(12) United States Patent
Kato et al.

(10) Patent No.: US 9,482,859 B2
(45) Date of Patent: Nov. 1, 2016

(54) DYE COMPOSITION FOR ELECTROWETTING DISPLAY, METHOD FOR MANUFACTURING SAME AND ELECTROWETTING DISPLAY DEVICE

(71) Applicant: FUJIFILM CORPORATION, Minato-ku, Tokyo (JP)

(72) Inventors: Takashi Kato, Shizuoka-ken (JP); Satoshi Higuchi, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/692,748

(22) Filed: Apr. 22, 2015

(65) Prior Publication Data

US 2015/0226957 A1  Aug. 13, 2015

Related U.S. Application Data

(63) Continuation of application No. PCT/JP2013/081208, filed on Nov. 19, 2013.

(30) Foreign Application Priority Data

Nov. 22, 2012  (JP) ................. 2012-256675

(51) Int. Cl.
| | |
|---|---|
| G02B 26/00 | (2006.01) |
| C09K 19/22 | (2006.01) |
| G09F 9/37 | (2006.01) |
| C09B 23/04 | (2006.01) |
| C09B 29/01 | (2006.01) |
| C09B 29/033 | (2006.01) |
| C09B 29/46 | (2006.01) |
| C09B 29/36 | (2006.01) |
| C09B 55/00 | (2006.01) |
| C09B 67/22 | (2006.01) |
| C09B 23/01 | (2006.01) |

(52) U.S. Cl.
CPC ......... *G02B 26/005* (2013.01); *C09B 23/0075* (2013.01); *C09B 23/04* (2013.01); *C09B 29/0003* (2013.01); *C09B 29/0085* (2013.01); *C09B 29/3652* (2013.01); *C09B 29/3682* (2013.01); *C09B 29/3691* (2013.01); *C09B 55/009* (2013.01); *C09B 67/0033* (2013.01); *G02B 26/004* (2013.01); *G09F 9/372* (2013.01)

(58) Field of Classification Search
USPC ........ 359/237, 242, 251–253, 290–296, 298; 252/582, 586, 299.68, 589, 187.26
See application file for complete search history.

(56) References Cited

U.S. PATENT DOCUMENTS

| | | | | |
|---|---|---|---|---|
| 8,854,714 | B2 * | 10/2014 | Clapp | G02B 26/004 252/586 |
| 2014/0078572 | A1 * | 3/2014 | Kato | C09B 23/04 359/290 |
| 2014/0191213 | A1 * | 7/2014 | Sawada | G02B 5/20 257/40 |
| 2014/0293394 | A1 * | 10/2014 | Kato | C09B 23/04 359/290 |
| 2014/0301110 | A1 * | 10/2014 | Chiang | G02B 5/0231 362/627 |

FOREIGN PATENT DOCUMENTS

| | | |
|---|---|---|
| JP | 2009-086668 A | 4/2009 |
| WO | 2011/017446 A1 | 2/2011 |
| WO | 2011/075720 A1 | 6/2011 |

OTHER PUBLICATIONS

K Zhou et al. "A full description of a simple and scalable fabrication process for electrowetting displays" J.Micromech. Microeng., vol. 19, 065029, IOP Publishing, Ltd., United Kingdom, May 22, 2009.

* cited by examiner

*Primary Examiner* — Stephone B Allen
*Assistant Examiner* — Brandi Thomas
(74) *Attorney, Agent, or Firm* — SOLARIS Intellectual Property Group, PLLC

(57) ABSTRACT

A method for manufacturing a dye composition for electrowetting display, the method including a processing step of processing a mixture liquid containing a nonpolar solvent and a dye, using an ion exchange resin, to obtain a dye composition for electrowetting display.

8 Claims, 2 Drawing Sheets

US 9,482,859 B2

DYE COMPOSITION FOR ELECTROWETTING DISPLAY, METHOD FOR MANUFACTURING SAME AND ELECTROWETTING DISPLAY DEVICE

CROSS-REFERENCE TO RELATED APPLICATIONS

This application is a continuation application of International Application No. PCT/JP2013/081208, filed Nov. 19, 2013, the disclosure of which is incorporated herein by reference in its entirety. Further, this application claims priority from Japanese Patent Application No. 2012-256675, filed Nov. 22, 2012, the disclosure of which is incorporated herein by reference in its entirety.

TECHNICAL FIELD

The present invention relates to a dye composition for electrowetting display, a method for manufacturing the same, and an electrowetting display device.

BACKGROUND ART

Conventionally, research has been conducted related to optical elements which are equipped with a cell including two or more kinds of liquid that do not mix with each other (for example, an oil and a hydrophilic liquid), and which are operated (driven) by application of voltage. As such an optical element, for example, an optical shutter, a variable focal length lens, an image display device, and the like are known. In recent years, technology utilizing the electrowetting phenomenon has attracted particular attention.

As an example of the technology utilizing the electrowetting phenomenon, an electrowetting display (an electrowetting display device) has been disclosed that includes: a first substrate and a second substrate which are arranged so as to face each other; plural projections which define plural pixel units; an electrically non-conductive first fluid which is enclosed in a pixel unit between two adjacent projections; and a second fluid which is an electrically conductive or a polar liquid that is immiscible with the first fluid (see, for example, Japanese Patent Application Laid-Open (JP-A) No. 2009-86668).

Further, as an electrically conductive liquid for use in electrowetting display devices, an electrically conductive liquid is known that includes a specific polar solvent and a dye (a pigment, a dye, an oligomer dye, or a polymer dye) and has a total amount of monatomic ions of 500 ppm or less (see, for example, WO 2011/017446 and WO 2011/075720).

Further, it is known that impurities included in a dye for use in electrowetting display devices cause a back flow phenomenon at the time of image display and that, as the means to address this problem, a means of purifying the dye by silica gel column chromatography is effective (see, for example, J. Micromech. Microeng., 2009, vol. 19, page 65029).

SUMMARY OF INVENTION

Technical Problem

However, in the case of using a composition including a nonpolar solvent and a dye as the dye composition for electrowetting display, it was found that, by the use of only a conventional technique (for example, purification by silica gel column chromatography only), there are cases in which the responsiveness is deteriorated and the back flow phenomenon becomes significant.

The invention has been made in view of the above, and has an object to provide a dye composition for electrowetting display, the dye composition exhibiting excellent responsiveness and being able to suppress a back flow phenomenon when used for electrowetting display; a method for manufacturing the same; and an electrowetting display device having excellent responsiveness in which a back flow phenomenon is suppressed. The technical problem of the invention is to accomplish the above object.

Solution to Problem

Specific means for achieving the above object are as follows.

<1> A method for manufacturing a dye composition for electrowetting display, the method including a processing step of processing a mixture liquid containing a nonpolar solvent and a dye, using an ion exchange resin, to obtain a dye composition for electrowetting display.

<2> The method for manufacturing a dye composition for electrowetting display according to <1>, wherein the ion exchange resin is a cation exchange resin.

<3> The method for manufacturing a dye composition for electrowetting display according to <1> or <2>, wherein in the processing step, the mixture is processed until the sodium ion content reaches 10 ppm or less.

<4> The method for manufacturing a dye composition for electrowetting display according to any one of <1> to <3>, wherein the dye is at least one selected from the group consisting of an azomethine dye and a methine dye.

<5> A dye composition for electrowetting display, the dye composition being obtained by processing a mixture liquid containing a nonpolar solvent and a dye, using an ion exchange resin.

<6> The dye composition for electrowetting display according to <5>, wherein the dye composition has a sodium ion content of 10 ppm or less.

<7> The dye composition for electrowetting display according to <5> or <6>, wherein the dye is at least one selected from the group consisting of an azomethine dye and a methine dye.

<8> The dye composition for electrowetting display according to any one of <5> to <7>, wherein the dye composition has a voltage retention ratio of 70% or higher, when disposing the dye composition between two electrodes having an interelectrode distance of 8 μm and each having a size of 10 mm×10 mm and measuring the voltage retention ratio under conditions of an applied voltage pulse amplitude of 5 V, an applied voltage pulse frequency of 60 Hz, and an applied voltage pulse width of 16.7 msec.

<9> An electrowetting display device including a display member having: a first substrate, at least a part of at least one surface of which is electrically conductive; a second substrate disposed so as to face an electrically conductive surface of the first substrate; a hydrophobic insulating film disposed on at least a part of a surface of the first substrate at the side having the electrically conductive surface; an electrically non-conductive oil that is disposed movably on the hydrophobic insulating film between the hydrophobic insulating film and the second substrate, and that is obtained by processing a mixture liquid containing a nonpolar solvent and a dye, using an ion exchange resin; and an electrically conductive hydrophilic liquid disposed between the hydrophobic insulating film and the second substrate so as to contact the electrically non-conductive oil, wherein an image is displayed by applying a voltage between the hydrophilic liquid and the electrically conductive surface of the first substrate and by changing a profile of the interface between the electrically non-conductive oil and the hydrophilic liquid.

<10> The electrowetting display device according to <9>, wherein the electrically non-conductive oil has a sodium ion content of 10 ppm or less.

<11> The electrowetting display device according to <9> or <10>, wherein the dye is at least one selected from the group consisting of an azomethine dye and a methine dye.

Advantageous Effects of Invention

According to the invention, it is possible to provide a dye composition for electrowetting display, the dye composition exhibiting excellent responsiveness and being able to suppress a back flow phenomenon when used for electrowetting display, and a method for manufacturing the same. Further, it is possible to provide an electrowetting display device having excellent responsiveness in which a back flow phenomenon is suppressed.

DESCRIPTION OF EMBODIMENTS

Figure 1:
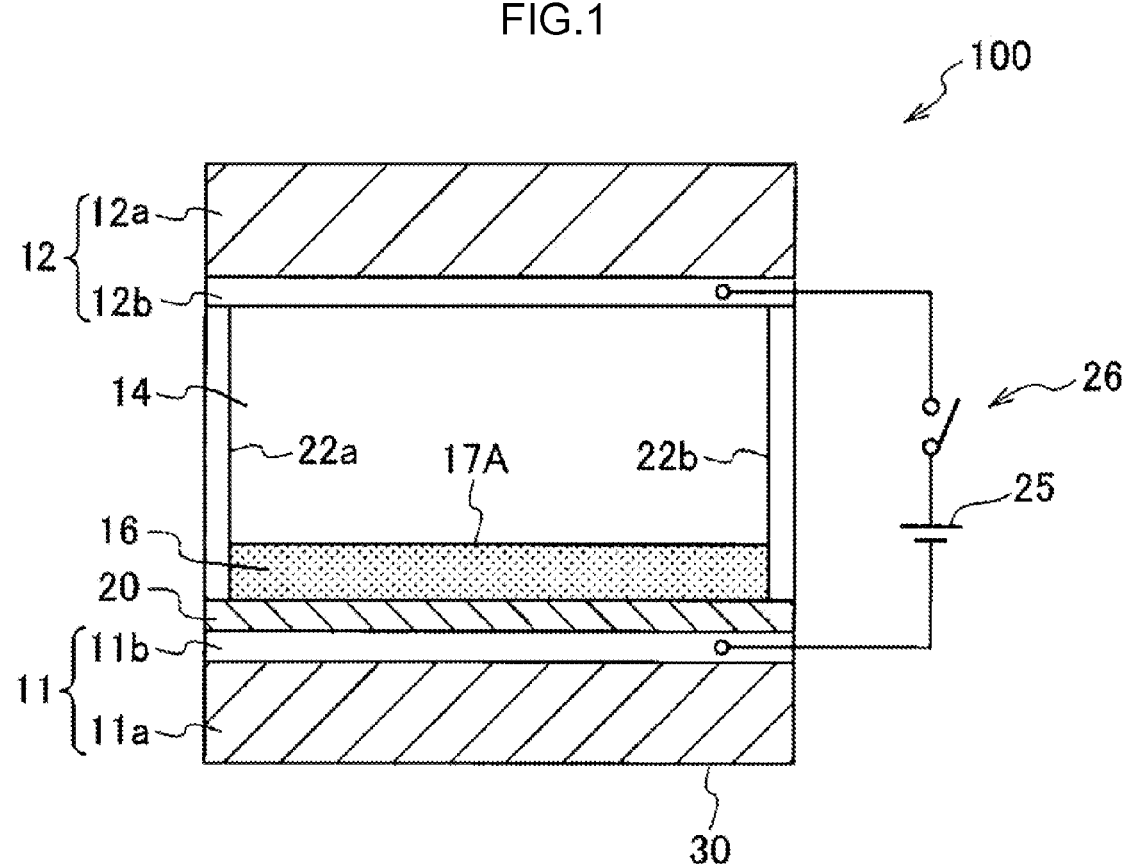
FIG. 1 is a schematic sectional view illustrating a voltage-off state of the electrowetting display device according to an exemplary embodiment of the invention.

Dye Composition for Electrowetting Display and Method for Manufacturing the Same The method for manufacturing a dye composition for electrowetting display (hereinafter, may also be referred to as, simply, "dye composition" or "oil") according to the invention includes a processing step of processing a mixture liquid containing a nonpolar solvent and a dye using an ion exchange resin to obtain a dye composition for electrowetting display.

Further, the dye composition for electrowetting display according to the invention is a dye composition obtained by processing a mixture liquid containing a nonpolar solvent and a dye using an ion exchange resin.

The dye composition according to the invention (including a dye composition obtained by the method for manufacturing a dye composition according to the invention; hereinafter the same applies.) is colored by the inclusion of the dye, and by the use of such a colored dye composition (oil), a colored image based on electrowetting display is formed.

Various investigations have been made concerning the electrowetting technology (electrowetting display).

For example, as an electrically conductive liquid for use in electrowetting display devices, an electrically conductive liquid is known that includes a specific polar solvent and a dye (a pigment, a dye, an oligomer dye, or a polymer dye) and has a total amount of monatomic ions of 500 ppm or less.

Further, it is known that impurities included in a dye for use in electrowetting display devices cause a back flow phenomenon at the time of image display and that, as the means to address this problem, a means of purifying the dye by silica gel column chromatography is effective.

However, in the case of using a composition including a nonpolar solvent and a dye as the dye composition for electrowetting display, it was found that, by the use of only the conventional technique, such as purification by silica gel column chromatography, there are cases in which responsiveness is deteriorated and the back flow phenomenon becomes significant.

In this regard, in the invention, by the use of a dye composition obtained by processing a mixture liquid containing a nonpolar solvent and a dye using an ion exchange resin, namely by the use of a dye composition, in which the content of ions that exert adverse influence on the responsiveness and back flow phenomenon is reduced, the responsiveness at the time of image display is remarkably improved and the back flow phenomenon is remarkably suppressed.

In a case in which a dye composition having a sodium ion (Na ion) content with respect to the total amount of the composition of 10 ppm or less is used as the dye composition, these effects are particularly effectively exhibited.

Here, the "back flow phenomenon" is a phenomenon in electrowetting display, in which the area of a dye composition (oil), which has been reduced by shrinkage when kept in a state of voltage being applied, gets larger with time.

The responsiveness is evaluated by the time (response time) from the time point of initiation of voltage application to the time point at which the area of the dye composition (oil) reaches the most shrunken state, or by the degree of shrinkage of the area of the dye composition (oil) due to voltage application.

When the response time is short and the degree of shrinkage of the area of the dye composition due to voltage application is large (namely, the area of the dye composition becomes smaller due to voltage application), it is meant that the responsiveness is excellent.

In the invention, it is preferable that the ion exchange resin is a cation exchange resin.

By using a cation exchange resin, cations (particularly, metal ions such as sodium ions or potassium ions, and in particular, sodium ions) that cause deterioration in responsiveness and back flow phenomenon are effectively removed, and thus, the effects of the invention are effectively exhibited.

In the invention, the processing step is preferably a step of processing a mixture liquid containing a nonpolar solvent and a dye, until the sodium ion content with respect to the total amount of the mixture liquid reaches 10 ppm or less (more preferably 5 ppm or less, even more preferably 2 ppm or less, and particularly preferably 1 ppm or less).

Among ions, metal ions, especially sodium ions, cause deterioration in responsiveness and back flow phenomenon, when included in the dye composition. By adjusting the sodium ion content to 10 ppm or less, the responsiveness is remarkably improved, and the back flow phenomenon is remarkably suppressed.

From the same viewpoint, the sodium ion content with respect to the total amount of the dye composition of the invention is preferably 10 ppm or less (more preferably 5 ppm or less, even more preferably 2 ppm or less, and particularly preferably 1 ppm or less). The lower limit of the sodium ion content with respect to the total amount of the dye composition of the invention is preferably 0 ppm.

In the invention, "ppm" represents ppm by mass.

The sodium ion content in the invention indicates the value measured by using ion chromatography.

As the cation exchange resin, a known ion exchange resin such as a styrene-based ion exchange resin or a styrene-divinylbenzene based ion exchange resin can be used.

As the cation exchange resin, a commercially available product can be used.

Examples of a commercially available cation exchange resin include AMBERLYST series manufactured by Sigma-Aldrich Corporation, DIAION series manufactured by Mitsubishi Chemical Corporation, and AMBERLITE series manufactured by Organo Corporation.

In the invention, the expression "processing a mixture liquid using an ion exchange resin" refers to an operation of bringing a mixture liquid into contact with an ion exchange resin to thereby reduce the content of ions in the mixture liquid.

Examples of this operation include (1) an operation (batch method) in which the mixture liquid and an ion exchange resin are mixed and stirred, and then the ion exchange resin is removed by filtration, and (2) an operation (flow method) in which the mixture liquid is passed through a column filled with an ion exchange resin. In the operation of (1) above and the operation of (2) above, a solvent (an auxiliary solvent) may be further added auxiliarily to the mixture liquid. In this case, it is preferable to distill off the auxiliary solvent under reduced pressure, after performing the ion exchange resin processing. Examples of such an auxiliary solvent include normal hexane, diethyl ether, and methylene chloride.

In the case of the operation of (1) above, there is no particular limitation as to the temperature of the mixture liquid during stirring, but the temperature is preferably from 10° C. to 80° C., and more preferably from 15° C. to 40° C.

The stirring time is not particularly limited, but is preferably 20 minutes or more.

There is no particular limitation on the upper limit of the stirring time, but considering the production efficiency, the upper limit of the stirring time is preferably 120 minutes or less.

The method for manufacturing a dye composition of the invention may include one or more additional steps other than the processing step.

Examples of the additional steps include a mixing step of mixing the nonpolar solvent and the dye to obtain a mixture liquid; a synthesis step of synthesizing the dye, the synthesis step being provided before the mixing step; and a dissolved-oxygen reducing step of reducing the amount of dissolved oxygen in the nonpolar solvent (for example, by argon gas bubbling or the like), the dissolved-oxygen reducing step being provided before the mixing step.

Further, it is preferable that the dye composition of the invention is an electrically non-conductive dye composition.

Here, the term "electrically non-conductive" refers to a property of having a specific resistance of $10^6$ Ω·cm or more (preferably $10^7$ Ω·cm or more). The upper limit of the specific resistance of the dye composition is preferably $10^{10}$ Ω·cm.

It is preferable that the dye composition of the invention has a low relative dielectric constant. Specifically, the relative dielectric constant of the dye composition is preferably in a range of 10.0 or less, and more preferably in a range of from 2.0 to 10.0. The relative dielectric constant being within this range is preferable in that the response speed is faster and driving (action) can be conducted at a lower voltage, as compared with the case in which the relative dielectric constant exceeds 10.0.

The relative dielectric constant is a value obtained based on an electrical capacitance that is obtained by injecting the dye composition into a glass cell, which is equipped with an ITO transparent electrode and has a cell gap of 10 μm, and measuring the electrical capacitance of the cell thus obtained by using a model 2353 LCR meter (measuring frequency: 1 kHz), manufactured by NF Corporation, at 20° C. and 40% RH.

It is preferable that the viscosity of the dye composition of the invention is 10 mPa·s or less in terms of dynamic viscosity at 25° C. In particular, the viscosity is preferably 0.01 mPa·s or more, and more preferably from 0.01 mPa·s to 5 mPa·s. The viscosity of the dye composition being 10 mPa·s or less is preferable in that the response speed is faster and driving (action) can be conducted at a lower voltage, as compared with the case in which the viscosity exceeds 10 mPa·s. Note that, the dynamic viscosity is a value measured by using a viscometer (model 500, manufactured by Toki Sangyo Co., Ltd.) under the condition of 25° C.

It is preferable that the dye composition (oil) of the invention does not substantially mix with the hydrophilic liquid, which is used together with the dye composition in electrowetting display. Specifically, the solubility (at 25° C.) of the dye composition with respect to the hydrophilic liquid is preferably 0.1% by mass or lower, more preferably 0.01% by mass or lower, and particularly preferably 0.001% by mass or lower. The lower limit of the solubility (at 25° C.) of the dye composition with respect to the hydrophilic liquid is preferably 0% by mass.

Since the dye composition of the invention has a low content of ions (specifically, sodium ions) due to processing using an ion exchange resin, the dye composition exhibits a high voltage retention ratio.

The voltage retention ratio of the dye composition of the invention, when disposing the dye composition between two electrodes having an interelectrode distance of 8 μm and each having a size of 10 mm×10 mm, and measuring the voltage retention ratio under the conditions of an applied voltage pulse amplitude of 5 V, an applied voltage pulse frequency of 60 Hz, and an applied voltage pulse width of 16.7 msec, is preferably 70% or higher, and more preferably 80% or higher. The upper limit of the voltage retention ratio is preferably 100%.

Besides performing measurement under the above-described measurement conditions, the voltage retention ratio (%) can be measured in accordance with a known method described in Japanese Patent Nos. 4983618 and 4157539 and the like.

Next, the components included in the dye composition of the invention (or the mixture liquid in the processing step) are explained.

<Nonpolar Solvent>

The dye composition of the invention (or the mixture liquid in the processing step; hereinafter the same applies) contains at least one nonpolar solvent.

Here, the term "nonpolar solvent" refers to a solvent that has a low relative dielectric constant value (a so-called apolar solvent). Examples of the nonpolar solvent include an aliphatic hydrocarbon solvent (preferably, an aliphatic hydrocarbon solvent having from 6 to 30 carbon atoms), for example, n-hexane, n-decane, dodecane, tetradecane, hexadecane, or the like; a solvent obtained by substituting an aliphatic hydrocarbon solvent with fluorine (for example, fluorocarbon oil or the like); and a silicone-containing solvent (for example, silicone oil or the like). Among them, an aliphatic hydrocarbon solvent is preferable.

It is preferable that the amount of dissolved oxygen in the nonpolar solvent is in a range of 10 ppm or less. When the amount of dissolved oxygen is 10 ppm or less, degradation of the dye composition is further suppressed and the responsiveness is further improved. The amount of dissolved oxygen is the lower the better, and is preferably 8 ppm or less. The lower limit of the amount of dissolved oxygen in the nonpolar solvent is preferably 0 ppm.

The content of the nonpolar solvent in the dye composition is preferably 30% by mass or higher, and more preferably 40% by mass or higher, with respect to the total amount of the dye composition. When the content of the nonpolar solvent is 30% by mass or higher, more excellent optical shutter characteristics are realized. Further, the solubility of the dye contained in the dye composition is maintained more favorably. The upper limit of the content of the nonpolar solvent in the dye composition is preferably 90% by mass, with respect to the total amount of the dye composition.

Further, the dye composition may contain a solvent other than the nonpolar solvent. In this case, the content of the nonpolar solvent in the dye composition is preferably 70% by mass or higher, and more preferably 90% by mass or higher, with respect to the total amount of the solvents included in the dye composition. In a case in which a solvent other than the nonpolar solvent is contained in the dye composition, the upper limit of the content of the nonpolar solvent in the dye composition is preferably 100% by mass, with respect to the total amount of the solvents included in the dye composition.

<Dye>

The dye composition of the invention contains at least one dye as the coloring material.

As the dye, a dye having solubility with respect to a nonpolar solvent is suitably selected.

There is no particular limitation as to the dye, as long as the dye has solubility with respect to a nonpolar solvent, and a known dye may be arbitrarily selected and used. In view of responsiveness when a voltage is applied, it is preferable that the dye has a solubility in n-hexane of 1% by mass or higher at 25° C. and 0.1 MPa, and has excellent solubility with respect to a nonpolar solvent, especially, solubility with respect to a hydrocarbon solvent. When a dye has a solubility of 1% by mass or higher, such a dye is suitable for an electrowetting display device. The solubility is preferably 3% by mass or higher, and more preferably 5% by mass or higher. While a higher solubility is more preferable, the solubility is generally about 80% by mass or lower.

The molecular weight of the dye is preferably in a range of from 50 to 2,000, particularly preferably in a range of from 100 to 1,500, and more preferably in a range of from 100 to 1,000.

Further, as the dye, a dye having one chromophore in one molecule is preferable.

The dye composition of the invention may include one kind of dye singly or may include two or more kinds thereof.

The content of the dye (in the case of using two or more kinds thereof, the total content) is preferably 10% by mass or higher, and more preferably 20% by mass or higher, with respect to the total amount of the dye composition. When the content of the dye is 10% by mass or higher (specifically, 20% by mass or higher), the density of the image can be made higher, and the distinguishability and clearness of the image are more enhanced.

As the OD (image density) value of the electrowetting display device gets higher, the distinguishability and clearness of the image are more enhanced. Therefore, the OD value of the dye per thickness of the dye composition layer (oil layer) at the maximum absorption wavelength is preferably OD=0.5/μm or more, more preferably 0.8/μm or more, and even more preferably 1.0/μm or more.

Further, in general, when the content of a dye is 10% by mass or higher (specifically, 20% by mass or higher) with respect to the total amount of a dye composition, the responsiveness of the dye composition with respect to voltage application tends to be easily deteriorated, and the back flow phenomenon in a state of voltage being applied tends to occur easily. Accordingly, in the invention, when the content of the dye is 10% by mass or higher (specifically, 20% by mass or higher) with respect to the total amount of the dye composition, the effect of the invention on improvement in responsiveness and the effect of the invention on suppression of the back flow phenomenon are more remarkably exhibited.

There is no particular limitation on the upper limit of the content of the dye, but from the viewpoint of responsiveness, the upper limit is preferably 80% by mass, more preferably 75% by mass, even more preferably 70% by mass, and particularly preferably 60% by mass.

As the dye, a dye including a structure that has a long chain alkyl group having from 6 to 30 carbon atoms is preferable, and a dye including a structure that has a long chain alkyl group having from 6 to 20 carbon atoms is particularly preferable. By the inclusion of a long chain alkyl group having from 6 to 30 carbon atoms in the structure of the dye, the solubility with respect to a nonpolar solvent is enhanced, and thus, the responsiveness is further enhanced.

Hereinafter, preferable scope of the dye in the invention is summarized.

From the viewpoint of effectively exhibiting the effects of the invention, the dye in the invention is more preferably at least one selected from the group consisting of an azo dye, an azomethine dye, a methine dye, a phthalocyanine dye, an anthraquinone dye, and a porphyrin dye.

The dye in the invention is particularly preferably at least one selected from the group consisting of an azomethine dye and a methine dye.

Since the azomethine dye and the methine dye each have a so-called donor-acceptor type chromophore, the dyes easily entrap ions. Accordingly, in a case in which the dye is at least one selected from the group consisting of an azomethine dye and a methine dye, the total amount of ions in the dye composition tends to be increased. Thus, in a case in which the dye is at least one selected from the group consisting of an azomethine dye and a methine dye, the effects of the invention are more effectively exhibited.

Hereinafter, preferable dyes are summarized.

1. Azo Dye

Preferable examples of the azo dye include azo dyes represented by the following Formula (1).

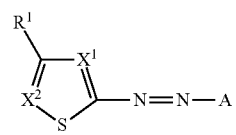

Formula (1)

In Formula (1) above, A represents an aromatic group or a heterocyclic group. $R^1$ represents a hydrogen atom, an alkyl group, an alkoxy group, a cyano group, a carbonyl group, a halogen atom, an aromatic group, or a heterocyclic group. Each of $X^1$ and $X^2$ independently represents —$C(R^2)$= or a nitrogen atom; and $R^2$ represents a hydrogen atom, an alkyl group, an alkoxy group, a cyano group, a nitro group, a carbonyl group, an aromatic group, or a heterocyclic group. $R^1$ and $R^2$ may bond to each other to form a ring structure.

In particular, the case in which at least one of $R^1$, $X^1$, $X^2$, or A has an alkyl group having from 6 to 30 carbon atoms, and all of $R^1$, $X^1$, $X^2$, and A have neither a dissociative group nor a halogen atom is preferable, from the viewpoints of having a high solubility with respect to the nonpolar solvent in the oil (the solubility in n-hexane is 1% by mass or higher at 25° C. and 0.1 MPa) and being able to produce an oil composition having a high dye concentration.

Among the azo dyes represented by Formula (1) above, compounds represented by the following Formula (1a) or Formula (1b) are preferable in terms of having more excellent solubility with respect to the nonpolar solvent.

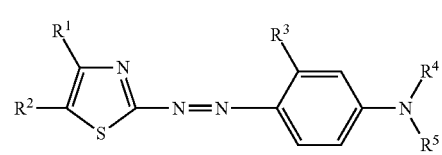

Formula (1a)

-continued

Formula (1b)

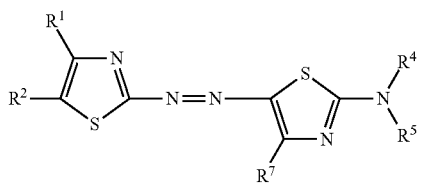

In Formulae (1a) and (1b) above, $R^1$ represents a hydrogen atom, an alkyl group, an alkoxy group, a cyano group, a carbonyl group, an aromatic group, or a heterocyclic group; and $R^2$ represents a hydrogen atom, an alkyl group, an alkoxy group, a cyano group, a nitro group, a carbonyl group, an aromatic group, or a heterocyclic group.

$R^3$ represents a hydrogen atom, an alkyl group, or an alkoxy group. In particular, $R^3$ preferably represents a hydrogen atom or an alkyl group having from 1 to 20 carbon atoms.

Each of $R^4$ and $R^5$ independently represents a hydrogen atom, an alkyl group, or an aromatic group. In particular, the case in which at least one of $R^4$ or $R^5$ represents an alkyl group is preferable, and the case in which at least one of $R^4$ or $R^5$ represents an alkyl group having from 6 to 30 carbon atoms (preferably from 6 to 20 carbon atoms) is more preferable. Further, the case in which both $R^4$ and $R^5$ represent an alkyl group having from 6 to 30 carbon atoms (preferably from 6 to 20 carbon atoms) is preferable.

$R^7$ represents a hydrogen atom, an alkyl group, an alkoxy group, a cyano group, a carbonyl group, or an aromatic group. In particular, $R^7$ preferably represents a hydrogen atom or an alkyl group having from 6 to 20 carbon atoms.

In Formulae (1a) and (1b) above, from the viewpoint of exhibiting more favorable solubility with respect to the nonpolar solvent, among the structures of Formulae (1a) and (1b), the case in which $R^1$ represents an alkyl group or an aryl group, $R^2$ represents an alkyl group or a cyano group, $R^3$ (in the case of Formula (1a); hereinafter the same applies.) represents a hydrogen atom or an alkyl group having from 6 to 20 carbon atoms, each of $R^4$ and $R^5$ represents a hydrogen atom or an alkyl group, and $R^7$ (in the case of Formula (1b); hereinafter the same applies.) represents a hydrogen atom or an alkyl group having from 6 to 20 carbon atoms is preferable. Further, among the structures of Formulae (1a) and (1b) above, the case in which $R^1$ represents an alkyl group having from 6 to 20 carbon atoms, $R^2$ represents a cyano group, $R^3$ represents a hydrogen atom or an alkyl group having from 6 to 20 carbon atoms, each of $R^4$ and $R^5$ represents an alkyl group having from 6 to 30 carbon atoms (preferably from 6 to 20 carbon atoms), and $R^7$ represents a hydrogen atom or an alkyl group having from 6 to 20 carbon atoms is preferable.

Further, the azo dye may be a compound having an optically active carbon atom, from the viewpoints of further increasing the solubility of dye with respect to the nonpolar solvent and being able to further decrease the viscosity. In particular, it is preferable that plural optically active sites (optically active points) exist in one molecule. Existence of three or more optically active sites (optically active points) in one molecule results in having higher effect on the improvement of solubility with respect to the nonpolar solvent. Examples of a substituent having an optically active point in a dye include a branched alkyl group which has an optically active point and has from 6 to 30 carbon atoms, and an alicyclic alkyl group which has an optically active point and has from 6 to 30 carbon atoms.

Whether an optically active point is included in the molecule is determined by analyzing the chemical structure of the molecule, and examining whether the four substituents possessed by the same carbon atom are groups that are all different from one another in the chemical structure. It can be easily judged that the dye compound is a stereoisomer mixture, since a stereoisomer mixture does not show an optical rotation (namely, the optical rotation is) 0° which is determined when a solution of the dye compound to be objected, the dye compound having an optically active point, is prepared and the optical rotation of the solution is measured.

Specific examples of the azo dye include the dyes shown below. However, the invention is not limited to these specific examples. Note that, "Me", "Et", "Bu", and "Ph" represent methyl, ethyl, butyl, and phenyl, respectively.

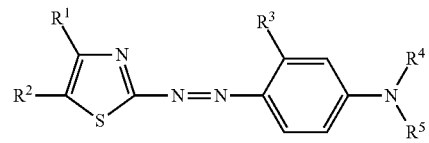

| No. | $R^1$ | $R^2$ | $R^3$ | $R^4$ | $R^5$ | Optically Active Points |
|-----|-------|-------|-------|-------|-------|-------------------------|
| D-1 | t-Bu | CN | H | n-$C_8H_{17}$ | n-$C_8H_{17}$ | 0 |
| D-2 | Me | CN | Me | n-$C_8H_{17}$ | n-$C_8H_{17}$ | 0 |
| D-3 | $CH_2CHEtC_4H_9$ | CN | MeO | $CH_2CHEtC_4H_9$ | $CH_2CHEtC_4H_9$ | 2 |
| D-4 | Ph | $NO_2$ | Et | n-$C_{10}H_{21}$ | n-$C_{10}H_{21}$ | 0 |
| D-5 | n-$C_8H_{17}$ | Me | Me | Et | Et | 0 |

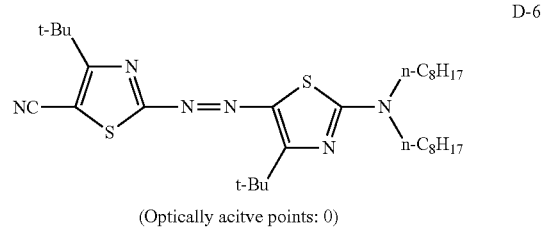

D-6

(Optically acitve points: 0)

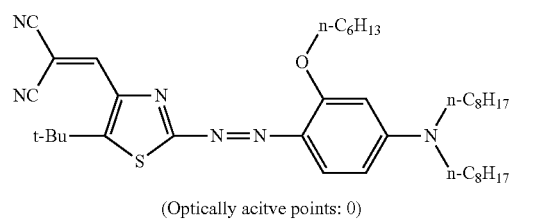

D-7

(Optically acitve points: 0)

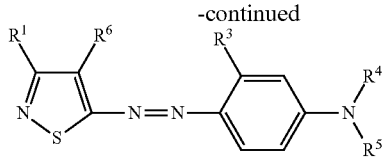
(5)
| No. | $R^1$ | $R^6$ | $R^3$ | $R^4$ | $R^5$ | Optically Active Points |
|---|---|---|---|---|---|---|
| D-8 | Me | CN | H | n-$C_8H_{17}$ | n-$C_8H_{17}$ | 0 |
| D-9 | t-Bu | CN | Me | n-$C_8H_{17}$ | n-$C_8H_{17}$ | 0 |
| D-10 | i-Pr | $CO_2CH_2CHEtC_4H_9$ | MeO | $CH_2CHEtC_4H_9$ | $CH_2CHEtC_4H_9$ | 2 |
| D-11 | n-$C_8H_{17}$ | $NO_2$ | H | Et | Et | 0 |
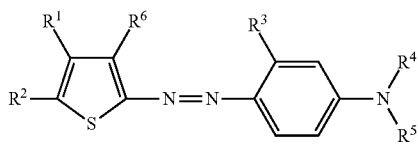
(25)
| No. | $R^2$ | $R^1$ | $R^6$ | $R^3$ | $R^4$ | $R^5$ | Optically Active Points |
|---|---|---|---|---|---|---|---|
| D-12 | $CO_2C_6H_{13}$ | Me | $CO_2C_6H_{13}$ | $NHCOC_6H_{13}$ | n-$C_8H_{17}$ | n-$C_8H_{17}$ | 0 |
| D-13 | Me | Me | CN | Me | n-$C_8H_{17}$ | n-$C_8H_{17}$ | 0 |
| D-14 | Bu | $CH_2CO_2Et$ | $CO_2Et$ | MeO | n-$C_{10}H_{21}$ | n-$C_{10}H_{21}$ | 0 |
| D-15 | n-$C_8H_{17}$ | Me | $CO_2Et$ | $C_6H_{13}O$ | Et | Et | 0 |

D-16
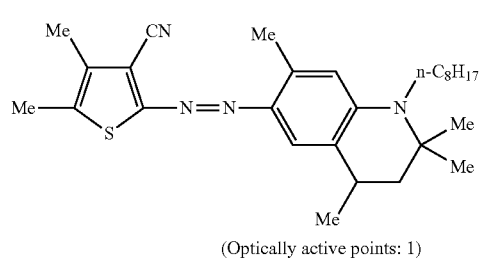
(Optically active points: 1)
D-17
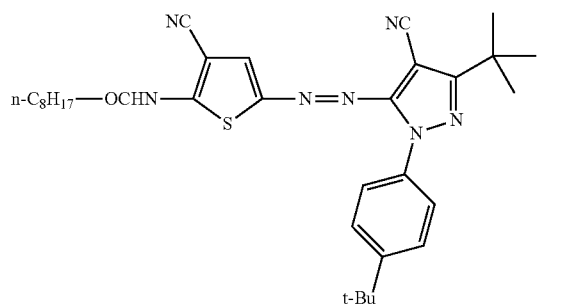
D-18
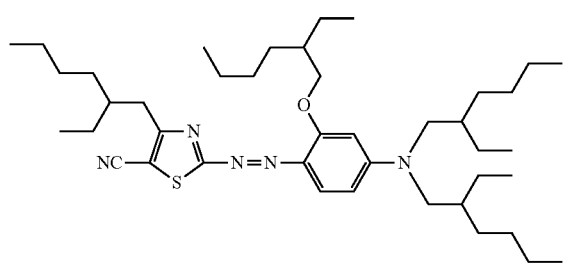
(Optically active points: 3)
D-19
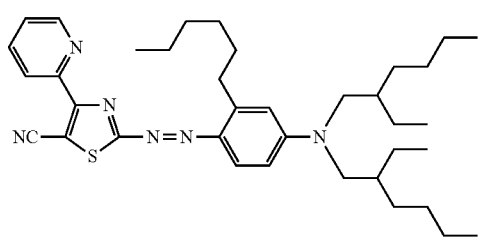
(Optically active points: 1)
D-20
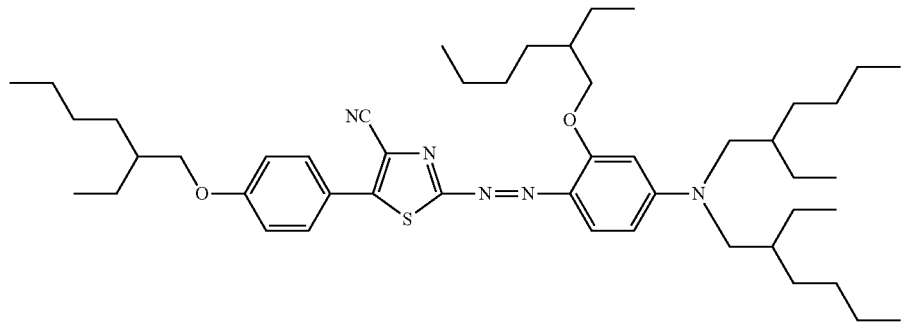
(Optically active points: 3)
D-21
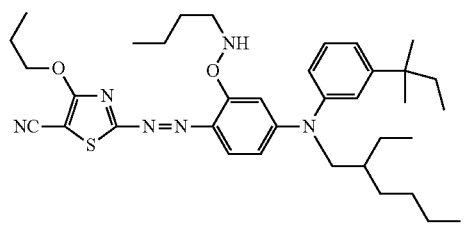
(Optically active points: 1)
D-22
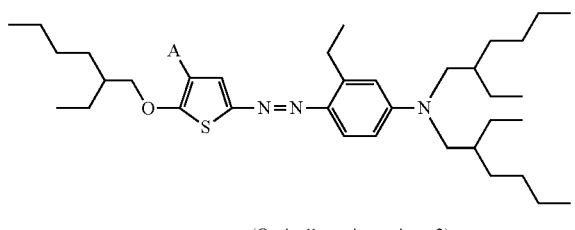
(Optically active points: 2)
D-23
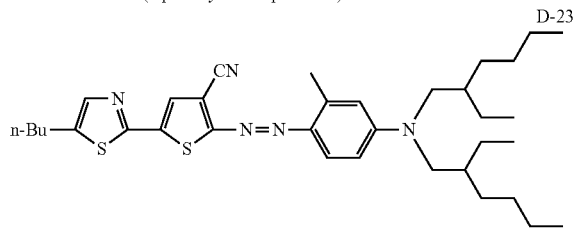
(Optically active points: 1)
D-24
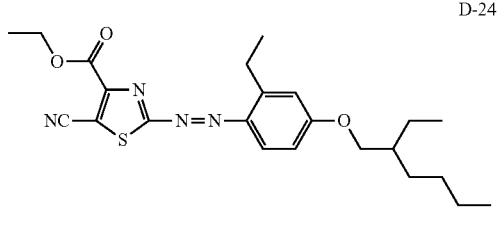
(Optically active points: 1)

Preferable examples of the azo dye further include azo dyes represented by the following Formula (2).

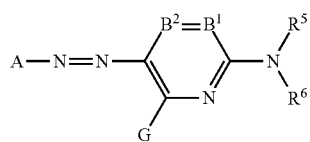

Formula (2)

In Formula (2) above, A represents a residue of a 5-membered heterocyclic diazo component A-NH$_2$. Each of B$^1$ and B$^2$ independently represents —CR$^1$=, —CR$^2$=, or a nitrogen atom. B$^1$ and B$^2$ never represent a nitrogen atom at the same time. Each of R$^5$ and R$^6$ independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Each of G, R$^1$, and R$^2$ independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, a substituted amino group that is substituted by an alkyl group, an aryl group, or a heterocyclic group, an acylamino group, a ureido group, a sulfamoylamino group, an alkoxycarbonylamino group, an aryloxycarbonylamino group, an alkylsulfonylamino group, an arylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfo group, or a heterocyclic thio group. R$^1$ and R$^5$ and/or R$^5$ and R$^6$ may bond to each other to form a 5-membered or 6-membered ring.

With regard to the azo dye represented by Formula (2) above, description in paragraphs 0033 to 0071 of JP-A No. 2006-126649 can be referred to.

Synthesis of the azo dye can be performed in accordance with a method described in Yutaka Hosoda, "Shin Senryo Kagaku (New Dye Chemistry)" (published on Dec. 21, 1973, Gihodo Shuppan, Ltd.), A. V. Ivashchenko, Dichroic Dyes for Liquid Crystal Displays, CRC Press, 1994, Bulletin of the Chemical Society of Japan, vol. 76, pages 607 to 612, 2003, and Bulletin of the Chemical Society of Japan, vol. 72, pages 127 to 132, 1999.

2. Azomethine Dye

Preferable examples of the azomethine dye include azomethine dyes represented by the following Formula (3).

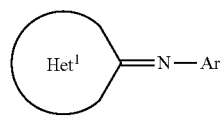

Formula (3)

In Formula (3) above, Het$^1$ represents a ring that does not have a dissociative group, and Ar represents an aromatic ring or saturated heterocycle that does not have a dissociative group.

In particular, from the viewpoints of having a high solubility with respect to the nonpolar solvent in the oil (the solubility in n-hexane is 1% by mass or higher at 25° C. and 0.1 MPa) and being able to produce an oil composition having a high dye concentration, the case in which the azomethine dye has, in the dye molecule, at least one straight-chain or branched alkyl group having a relatively large number of carbon atoms, i.e., from 6 to 30 carbon atoms, is preferable.

Hereinafter, the azomethine dye represented by Formula (3) is described in detail.

The azomethine dye represented by Formula (3) is preferably a dye that does not have, in a molecule thereof, a dissociative group (an NH group is not included), such as —SO$_3$H, —PO$_3$H$_2$, —CO$_2$H, or —OH. Accordingly, the solubility with respect to the nonpolar solvent is more enhanced.

From the viewpoint of having more excellent solubility with respect to the nonpolar solvent, it is preferable that this azomethine dye has a straight-chain or branched alkyl group having from 6 to 30 carbon atoms in a molecule thereof.

For the same reason as described above, in a case in which the azomethine dye has the straight-chain or branched alkyl group in a molecule thereof, the alkyl group is preferably a straight-chain or branched alkyl group having from 6 to 20 carbon atoms, and more preferably a straight-chain or branched alkyl group having from 6 to 10 carbon atoms.

In Formula (3) above, examples of the ring represented by Het$^1$ include a 5-membered or 6-membered hydrocarbon ring and a 5-membered or 6-membered heterocycle. Examples of the ring include a benzene ring, a pyrazole ring, an isooxazole ring, a pyrazolotriazole ring, a pyrrolotriazole ring, a naphthalene ring, a pyridone ring, and a barbiturate ring.

The ring represented by Het$^1$ may be unsubstituted or substituted. In a case in which Het$^1$ has a substituent, the substituent can be selected as appropriate from substituents except dissociative groups. Specific examples of the substituent include an alkyl group, an alkoxy group, an aryl group, —COOR$^{11}$, and —CONR$^{11}$R$^{12}$ wherein each of R$^{11}$ and R$^{12}$ independently represents a hydrogen atom, an alkyl group, or an aryl group, and R$^{11}$ and R$^{12}$ may bond to each other to form a 5-membered ring, a 6-membered ring, or a 7-membered ring.

In this substituent, the alkyl group, the alkoxy group, and the aryl group have the same definitions as the alkyl group, the alkoxy group, and the aryl group in R$^1$ of Formula (3-2) described below, respectively, and so are the preferable embodiments.

The aromatic ring or saturated heterocycle represented by Ar is preferably a 5-membered or 6-membered ring, and preferable examples thereof include an aromatic ring such as a benzene ring, a naphthalene ring, a pyrrole ring, an indole ring, a pyridine ring, a quinoline ring, a pyrazine ring, a quinoxaline ring, a thiazole ring, a thiazoline ring, an oxazole ring, an oxazoline ring or an imidazole ring, and a saturated heterocycle such as a pyrrolidine ring, tetrahydrofuran, tetrahydrofuran, tetrahydrothiophene, thiazoline, oxazoline, or imidazoline.

Among them, a benzene ring, a pyrrole ring, and an indole ring are more preferable as Ar.

The aromatic ring or saturated heterocycle represented by Ar may be unsubstituted or substituted. In a case in which Ar has a substituent, the substituent can be selected as appropriate from substituents except dissociative groups. Specific examples of the substituent include an alkyl group, an alkoxy group, an aryl group, and a halogen atom. The alkyl group, the alkoxy group, and the aryl group have the same definitions as the alkyl group, the alkoxy group, and the aryl group in R$^1$ of Formula (3-2) described below, respectively, and so are the preferable embodiments.

Among the azomethine dyes represented by Formula (3) above, an azomethine dye represented by the following Formula (3-2) is preferable.

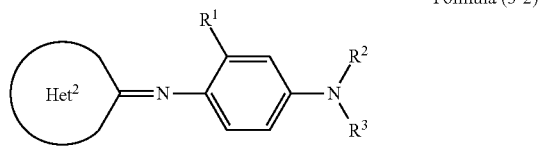

Formula (3-2)

In Formula (3-2) above, Het² represents a coupler mother nucleus that does not have a dissociative group. The coupler mother nucleus represented by Het² refers to a molecular structure (chromophore (basic skeleton)) that is needed for a dye to develop a color. Namely, the coupler mother nucleus is a partial structure which is constituted with continuous unsaturated bonds in the compound (a partial structure needed to form a conjugated system), and is, for example, a partial structure in which an aromatic series, >C=C<, >C=O, >C=N—, >N=N<, or the like is linked. Specific examples of the coupler mother nucleus include an isooxazolone skeleton, a pyrazolone skeleton, a pyrazolotriazole skeleton, a pyrrolotriazole skeleton, a benzoquinone skeleton, a naphthoquinone skeleton, a pyridone skeleton, a barbiturate skeleton, a pyrimidine skeleton, a thiobarbiturate skeleton, and an anilide skeleton.

Specifically, the coupler mother nucleus is preferably a molecular skeleton including a 5-membered or 6-membered hydrocarbon ring or a 5-membered or 6-membered heterocycle. Examples of the hydrocarbon ring or the heterocycle include a benzene ring, a pyrazole ring, an isooxazole ring, a pyrazolotriazole ring, a pyrrolotriazole ring, a naphthalene ring, a pyridone ring, a barbiturate ring, a thiobarbiturate ring, and a pyrimidine ring. Among them, preferable examples of the coupler mother nucleus include a benzene ring, a pyrazole ring, an isooxazole ring, a pyrazolotriazole ring, a pyrrolotriazole ring, and a naphthalene ring.

In Formula (3-2), $R^1$ represents a hydrogen atom, an alkyl group, an alkoxy group, or an aryl group. In the groups represented by $R^1$, dissociative groups are not included.

In Formula (3-2), the alkyl group represented by $R^1$ may be unsubstituted or substituted, and is preferably an alkyl group having from 1 to 20 carbon atoms. Preferable examples of the alkyl group include a methyl group, an ethyl group, a normal butyl group, a tertiary butyl group, a 1-methylcyclopropyl group, a 3-heptyl group, a 2-ethylhexyl group, a 2-methylhexyl group, a normal nonyl group, a normal undecyl group, a chloromethyl group, a trifluoromethyl group, an ethoxycarbonylmethyl group, a perfluoroalkyl group (for example, a perfluoromethyl group), and the like. In particular, an alkyl group having from 1 to 15 carbon atoms (even more preferably, from 1 to 10 carbon atoms) is more preferable, and a methyl group, an ethyl group, a tertiary butyl group, a hexyl group, and a 2-ethylhexyl group are particularly preferable.

In Formula (3-2), the alkoxy group represented by $R^1$ may be unsubstituted or substituted, and is preferably an alkoxy group having from 1 to 20 carbon atoms. Preferable examples of the alkoxy group include a methoxy group, an ethoxy group, a normal butoxy group, a tertiary butoxy group, a 3-heptyloxy group, a normal hexyloxy group, a 2-ethylhexyloxy group, a normal nonyloxy group, a normal undecyloxy group, a chloromethyloxy group, a trifluoromethoxy group, an ethoxycarbonylmethoxy group, a perfluoroalkyloxy group (for example, a perfluoromethoxy group), and the like. In particular, an alkoxy group having from 1 to 15 carbon atoms (even more preferably, from 1 to 10 carbon atoms) is more preferable, and a methoxy group, an ethoxy group, a hexyloxy group, and a 2-ethylhexyloxy group are particularly preferable.

In Formula (3-2), the aryl group represented by $R^1$ may be unsubstituted or substituted, and is preferably an aryl group having from 6 to 20 carbon atoms. Preferable examples of the aryl group include a phenyl group, a 4-methoxyphenyl group, a hexyloxyphenyl group, an octyloxyphenyl group, a 2,6-dimethylphenyl group, a 4-dibutylaminophenyl group, a 4-(2-ethylhexanoylaminophenyl group, a 4-hexylphenyl group, and the like. In particular, an aryl group having from 6 to 16 carbon atoms (even more preferably from 6 to 12 carbon atoms) is more preferable, and a phenyl group is particularly preferable.

In Formula (3-2), each of $R^2$ and $R^3$ independently represents an alkyl group or an aryl group. In the groups represented by $R^2$ or $R^3$, dissociative groups are not included.

In Formula (3-2), the alkyl group represented by $R^2$ or $R^3$ may be unsubstituted or substituted, and is preferably an alkyl group having from 1 to 30 carbon atoms. Preferable examples of the alkyl group include a methyl group, an ethyl group, a normal butyl group, a tertiary butyl group, a 1-methylcyclopropyl group, a 3-heptyl group, a 2-ethylhexyl group, a 2-methylhexyl group, a normal nonyl group, a normal undecyl group, a chloromethyl group, a trifluoromethyl group, an ethoxycarbonylmethyl group, a perfluoroalkyl group (for example, a perfluoromethyl group), and the like. In particular, an alkyl group having from 6 to 30 carbon atoms is more preferable, an alkyl group having from 6 to 20 carbon atoms is even more preferable, and a hexyl group, an octyl group, a 2-ethylhexyl group, and a 2-methylhexyl group are particularly preferable.

In Formula (3-2), the aryl group represented by $R^2$ or $R^3$ may be unsubstituted or substituted, and is preferably an aryl group having from 6 to 16 carbon atoms. Preferable examples of the aryl group include a phenyl group, a 4-methoxyphenyl group, a 4-t-butylphenyl group, a 4-dibutylaminophenyl group, a 4-(2-ethylhexanoylaminophenyl group, a 4-hexylphenyl group, and the like. In particular, an aryl group having from 6 to 12 carbon atoms is more preferable, and a phenyl group is particularly preferable.

In Formula (3-2), in a case in which the group represented by $R^1$ to $R^3$ has a substituent, examples of the substituent may include a halogen atom, an alkyl group, an aryl group, an alkoxy group, and an aryloxy group.

In Formula (3-2) above, it is preferable that at least one selected from the group consisting of Het² and the groups of $R^1$ to $R^3$ in the molecule has a straight-chain or branched alkyl group having a relatively large number of carbon atoms of from 6 to 30 carbon atoms. Accordingly, the azomethine dye exhibits more favorable solubility with respect to the nonpolar solvent.

From such a viewpoint, among the structures of Formula (3-2), a structure in which $R^1$ represents a hydrogen atom, a methyl group, or a methoxy group, and one or both of $R^2$ and $R^3$ represent a straight-chain or branched alkyl group having from 6 to 20 carbon atoms (more preferably from 6 to 12 carbon atoms) is particularly preferable.

Specific examples of the azomethine dye include the dyes shown below. However, the invention is not limited thereto. Note that, "Me", "Et", "Bu", and "Ph" represent methyl, ethyl, butyl, and phenyl, respectively.

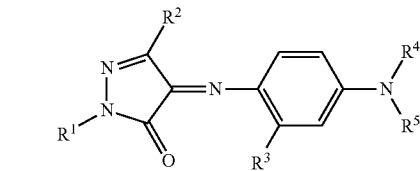

| No. | R¹ | R² | R³ | R⁴ | R⁵ |
|---|---|---|---|---|---|
| E-1 | Ph | Me | Me | n-C₈H₁₇ | n-C₈H₁₇ |
| E-2 | i-Pr | t-Bu | Me | n-C₈H₁₇ | n-C₈H₁₇ |
| E-3 | C₆H₁₃ | EtO | MeO | CH₂CHEtC₄H₉ | CH₂CHEtC₄H₉ |
| E-4 | Ph | i-Pr | Et | n-C₁₀H₁₂ | n-C₁₀H₂₁ |
| E-5 | n-C₈H₁₇ | t-Bu | Me | Et | Et |

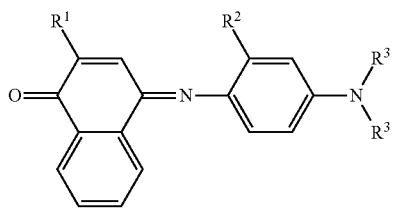

| No. | R¹ | R² | R³ |
|---|---|---|---|
| E-6 | H | H | n-C₈H₁₇ |
| E-7 | Et | H | CH₂CHEtC₄H₉ |
| E-8 | CONHC₁₆H₃₃ | Et | Et |
| E-9 | CONHC₁₆H₃₃ | H | n-Bu |

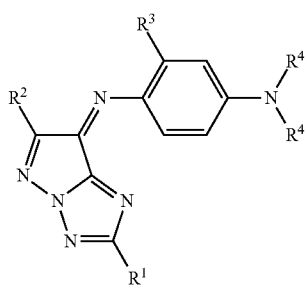

| No. | R¹ | R² | R³ | R⁴ |
|---|---|---|---|---|
| E-10 | i-Pr | t-Bu | H | n-C₈H₁₇ |
| E-11 | t-Bu | i-Pr | Me | CH₂CHEtC₄H₉ |

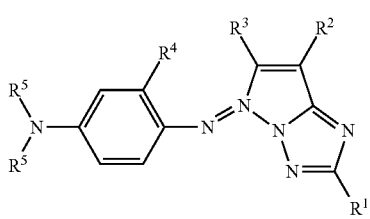

| No. | R¹ | R² | R³ | R⁴ | R⁵ |
|---|---|---|---|---|---|
| E-12 | 4-t-Bu-Ph | EST1 | CN | Me | n-C₈H₁₇ |
| E-13 | t-Bu | t-Bu | Me | H | CH₂CHEtC₄H₉ |
| E-14 | n-C₈H₁₇ | Me | CN | Et | n-C₈H₁₇ |
| E-15 | t-Bu | EST1 | MeO | H | n-C₁₀H₂₁ |

"EST1" represents the following structure.

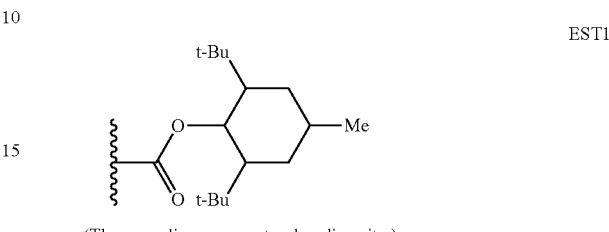

(The wavy line represents a bonding site.)

Specific examples of the azomethine dye further include the dye 2 in the Examples described below.

Synthesis of the azomethine dye in the invention can be performed in accordance with a method described in Journal of the American Chemical Society (J. Am. Chem. Soc.), 1957, vol. 79, page 583, and JP-A Nos. H9-100417, 2011-116898, 2011-12231, 2010-260941, and 2007-262165.

3. Methine Dye

Preferable examples of the methine dye include methine dyes represented by the following Formula (4).

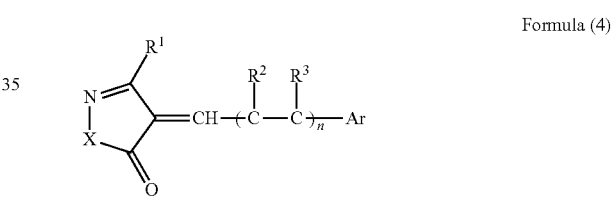

Formula (4)

In Formula (4), $R^1$ represents a hydrogen atom, an alkyl group, an alkoxy group, an aryl group, —$COOR^{11}$, or —$CONR^{11}R^{12}$, and Ar represents an aromatic group. Each of $R^2$ and $R^3$ independently represents a hydrogen atom or an alkyl group. Each of $R^{11}$ and $R^{12}$ independently represents a hydrogen atom, an alkyl group, or an aryl group. $R^{11}$ and $R^{12}$ may bond to each other to form a 5-membered ring, a 6-membered ring, or a 7-membered ring. n represents an integer from 0 to 2. $R^1$, $R^2$, $R^3$, and Ar each do not have a dissociative group. X represents an oxygen atom or N—$R^{13}$, and each of $R^{13}$ independently represents a hydrogen atom, an alkyl group, or an aryl group.

In Formula (4), the alkyl group or the alkoxy group preferably has from 1 to 30 carbon atoms, more preferably from 1 to 20 carbon atoms, even more preferably from 1 to 15 carbon atoms, and particularly preferably from 1 to 10 carbon atoms.

The aryl group in Formula (4) preferably has from 6 to 30 carbon atoms, more preferably from 6 to 20 carbon atoms, even more preferably from 6 to 16 carbon atoms, and particularly preferably from 6 to 12 carbon atoms.

However, from the viewpoints of having a high solubility with respect to the nonpolar solvent in the oil (the solubility in n-hexane is 1% by mass or higher at 25° C. and 0.1 MPa) and being able to produce an oil composition having a high dye concentration, the case in which the methine dye has, in the dye molecule, at least one straight-chain or branched alkyl group having a relatively large number of carbon atoms, i.e., from 6 to 30 carbon atoms (preferably from 6 to 20 carbon atoms, more preferably from 6 to 16 carbon atoms, and particularly preferably from 6 to 12 carbon atoms) is preferable.

The methine dye represented by Formula (4) is preferably a methine dye represented by the following Formula (4-2).

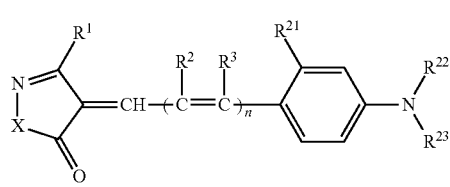

Formula (4-2)

In Formula (4-2), $R^1$, $R^2$, $R^3$, X, and n have the same definitions as $R^1$, $R^2$, $R^3$, X, and n in Formula (4), respectively, and so are the preferable scopes.

In Formula (4-2), $R^{21}$, $R^{22}$, and $R^{23}$ have the same definitions as $R^1$, $R^2$, and $R^3$ in Formula (3-2) described above (azomethine dye), respectively, and so are the preferable scopes.

In Formula (4-2), it is preferable that at least one group selected from $R^1$, $R^2$, $R^3$, $R^{21}$, $R^{22}$, or $R^{23}$ in the molecule has a straight-chain or branched alkyl group having a relatively large number of carbon atoms, i.e., from 6 to 30 carbon atoms. Accordingly, the methine dye exhibits favorable solubility with respect to the nonpolar solvent.

Among the structures of Formula (4-2), the case in which X represents an oxygen atom, $R^1$ represents a hydrogen atom, an alkyl group (preferably an alkyl group having from 1 to 10 carbon atoms), or an alkoxy group (preferably an alkoxy group having from 1 to 10 carbon atoms), n represents 0, $R^{21}$ represents a hydrogen atom, an alkyl group (preferably an alkyl group having from 1 to 10 carbon atoms), or an alkoxy group (preferably an alkoxy group having from 1 to 10 carbon atoms), and one or both of $R^{22}$ and $R^{23}$ represent a straight-chain or branched alkyl group having from 6 to 16 carbon atoms (more preferably from 6 to 12 carbon atoms) is preferable.

Specific examples of the methine dye include the dyes shown below. However, the invention is not limited thereto. Note that, "Me", "Et", "Bu", and "Ph" represent methyl, ethyl, butyl, and phenyl, respectively.

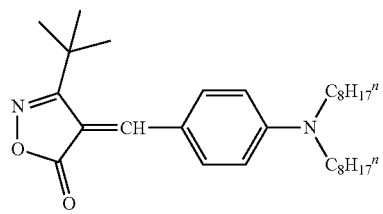

F-1

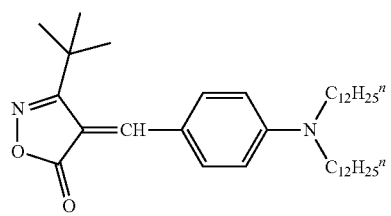

F-2

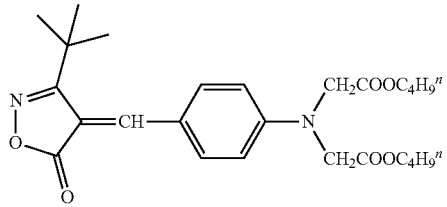

F-3

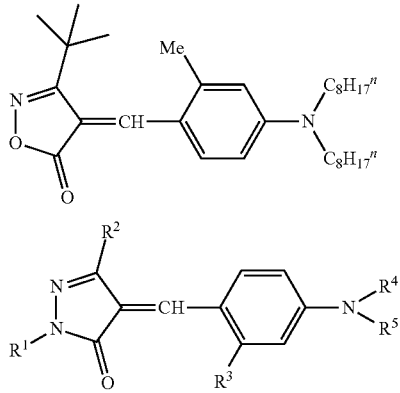

F-4

| No. | $R^1$ | $R^2$ | $R^3$ | $R^4$ | $R^5$ |
|---|---|---|---|---|---|
| F-5 | Me | Me | H | n-$C_8H_{17}$ | n-$C_8H_{17}$ |
| F-6 | i-Pr | t-Bu | Me | n-$C_8H_{17}$ | n-$C_8H_{17}$ |
| F-7 | $C_6H_{13}$ | EtO | MeO | n-$C_8H_{17}$ | n-$C_8H_{17}$ |
| F-8 | Ph | i-Pr | Et | n-$C_{10}H_{21}$ | n-$C_{10}H_{21}$ |
| F-9 | n-$C_8H_{17}$ | Me | ET1 | Et | Et |

"ET1" represents the following structure.

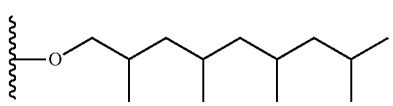

ET1

(The wavy line represents a bonding site.)

Specific examples of the methine dye further include the dye 1 in the Examples described below.

These compounds can be produced in accordance with a known method described in Japanese Patent No. 2707371, JP-A Nos. H5-45789, 2009-263517, and H3-72340, and the like.

4. Phthalocyanine Dye

As the phthalocyanine dye, a phthalocyanine dye that has an alkyl group having 6 or more carbon atoms is preferably used. As a specific example, a dye described in, for example, Applied Physics Express, vol. 4, page 21604, 2011, Molecular Crystal Liquid Crystal, vol. 183, page 411, 1990, and Molecular Crystal Liquid Crystal, vol. 260, page 255, 1995, or a dye represented by Formula (C1) described in JP-A No. 2006-133508, or the like is used, if appropriate.

5. Anthraquinone Dye

Preferable examples of the anthraquinone dye include anthraquinone dyes represented by the following Formula (5).

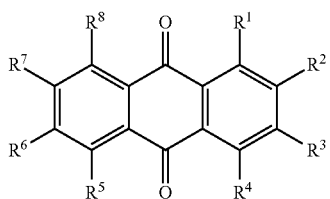

Formula (5)

In Formula (5), each of $R^1$, $R^4$, $R^5$, and $R^8$ independently represents a hydrogen atom, $NR^{11}R^{12}$, an alkylthio group, an arylthio group, an alkoxy group, or an aryloxy group. Each of $R^2$, $R^3$, $R^6$, and $R^7$ independently represents a hydrogen atom, an alkyl group, or an alkoxycarbonyl group. Each of $R^{11}$ and $R^{12}$ independently represents a hydrogen atom, an alkyl group, an aryl group, or a heterocyclic group; however, $R^{11}$ and $R^{12}$ never represent a hydrogen atom at the same time. In Formula (5), a form in which an alkyl group having 4 or more carbon atoms is included is preferable. Specific examples thereof include dyes described in WO 2008/142086.

Synthesis of the anthraquinone dye can be performed in accordance with a method described in Yutaka Hosoda, "Shin Senryo Kagaku (New Dye Chemistry)" (published on Dec. 21, 1973, Gihodo Shuppan, Ltd.) and A. V. Ivashchenko, Dichroic Dyes for Liquid Crystal Displays, CRC Press, 1994.

6. Porphyrin Dye

Preferable examples of the porphyrin dye include porphyrin dyes represented by the following Formula (6).

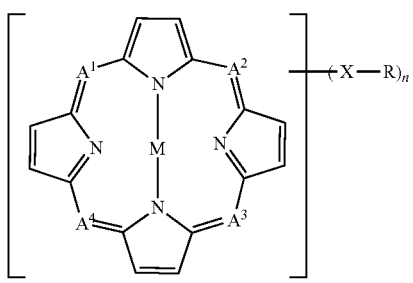

Formula (6)

In Formula (6), each of $A^1$ to $A^4$ independently represents a nitrogen atom or $—C(R^1)=$; M represents a metal atom, a metal oxide, a metal hydroxide, a metal halide, or two hydrogen atoms; and —X—R represents a monovalent group that substitutes on the pyrrole ring.

In Formula (6), R represents an alkyl group having from 4 to 30 carbon atoms; X represents a single bond, an oxygen atom, a sulfur atom, or $—N(R^2)—$; and n represents an integer from 1 to 8.

In Formula (6), $R^1$ represents a hydrogen atom, an alkyl group, an aryl group, or $—X^{11}—R^{11}$; and $R^2$ represents a hydrogen atom, an alkyl group, or an aryl group.

In Formula (6), $R^{11}$ represents an alkyl group having from 4 to 30 carbon atoms; and $X^{11}$ represents a single bond, an oxygen atom, a sulfur atom, or $—N(R^{12})—$.

In Formula (6), $R^{12}$ represents a hydrogen atom, an alkyl group, or an aryl group.

In Formula (6), each of $A^1$ to $A^4$ independently represents a nitrogen atom $(—N=)$ or $—C(R^1)=$.

Here, $R^1$ represents a hydrogen atom, an alkyl group, an aryl group, or $—X^{11}—R^{11}$.

In a case in which $R^1$ represents an alkyl group, the alkyl group is preferably an alkyl group having from 1 to 20 carbon atoms (more preferably from 1 to 15 carbon atoms). The alkyl group may be a straight-chain alkyl group, a branched alkyl group, or a cyclic alkyl group. Further, if necessary, the alkyl group may be substituted by the substituent described below.

In a case in which $R^1$ represents an aryl group, the aryl group is preferably an aryl group having from 6 to 20 carbon atoms (more preferably from 6 to 15 carbon atoms), and is more preferably a phenyl group or a naphthyl group. The aryl group may be substituted by the substituent described below, if necessary.

$X^{11}$ and $R^{11}$, in a case in which $R^1$ represents $—X^{11}—R^{11}$, are described below.

Among the specific porphyrin dyes, a dye in which each of $A^1$ to $A^4$ represents a nitrogen atom $(—N=)$ is preferable as the dye having a hue of from violet to cyan, and a dye in which each of $A^1$ to $A^4$ represents $—C(R^1)=$ is preferable as the dye having a yellow hue.

In Formula (6), it is preferable that each of $A^1$ to $A^4$ represents a nitrogen atom, from the viewpoint of more effectively exhibiting the effects of the invention.

In Formula (6), M represents a metal atom, a metal oxide, a metal hydroxide, a metal halide, or two hydrogen atoms.

Examples of the metal atom include Zn, Mg, Si, Sn, Rh, Pt, Pd, Mo, Mn, Pb, Cu, Ni, Co, and Fe.

Examples of the metal oxide include VO and TiO.

Examples of the metal hydroxide include $Si(OH)_2$.

Examples of the metal halide include AlCl, InCl, FeCl, $TiCl_2$, $SnCl_2$, $SiCl_2$, and $GeCl_2$.

From the viewpoints of the hue and the molar absorption coefficient, M preferably represents a metal atom, a metal halide, or two hydrogen atoms, more preferably Mg, Cu, Zn, AlCl, or two hydrogen atoms, and particularly preferably Mg or two hydrogen atoms.

In Formula (6), —X—R represents a monovalent group that substitutes on one or more of the four pyrrole rings included in Formula (6). In the porphyrin dye represented by Formula (6), the number of the positions capable of being substituted by —X—R is eight (the third position and the fourth position of each pyrrole ring).

In Formula (6), n represents the number of —X—R.

n represents an integer from 1 to 8; however, from the viewpoint of more effectively exhibiting the effects of the invention, n preferably represents an integer from 4 to 8, more preferably an integer from 6 to 8, and most preferably 8.

In a case in which n represents an integer of 2 or more, the two or more —X—R's may be the same or different from each other.

In —X—R, R represents an alkyl group having from 4 to 30 carbon atoms.

When the number of carbon atoms of the alkyl group represented by R is equal to or less than 3, the solubility of the dye may be insufficient, the responsiveness may be deteriorated, or the back flow phenomenon may become significant.

When the number of carbon atoms of the alkyl group represented by R is more than 30, the molecular weight of the dye becomes large, and thus, the solubility or molar absorption coefficient of the dye may be lowered.

The alkyl group represented by R preferably has from 4 to 20 carbon atoms, and particularly preferably from 8 to 10 carbon atoms.

The alkyl group represented by R may be a straight-chain alkyl group, a branched alkyl group, or a cyclic alkyl group. However, from the viewpoint of the solubility of the dye, the alkyl group represented by R is preferably a branched alkyl group. Further, the alkyl group represented by R is particularly preferably a branched alkyl group having from 4 to 20 carbon atoms (more preferably from 8 to 10 carbon atoms).

The alkyl group represented by R may be substituted by the substituent described below, if necessary. For example, from the viewpoints of improvement in responsiveness and suppression of back flow, it is also preferable that the alkyl group represented by R is a fluoroalkyl group.

In —X—R, X represents a single bond, an oxygen atom (—O—), a sulfur atom (—S—), or —N($R^2$)—.

$R^2$ represents a hydrogen atom, an alkyl group, or an aryl group.

In a case in which $R^2$ represents an aryl group, the aryl group has the same definition as the aryl group described in the explanation of $R^1$ above, and its preferable scope is also the same.

In a case in which $R^2$ represents an alkyl group, the alkyl group has the same definition as the alkyl group described in the explanation of $R^1$ above, and its preferable scope is also the same.

X is not particularly limited, but from the viewpoint of the hue, X preferably represents a single bond, an oxygen atom, or a sulfur atom, and particularly preferably a single bond or a sulfur atom.

In a case in which $R^1$ represents —$X^{11}$—$R^{11}$, $R^{11}$ represents an alkyl group having from 4 to 30 carbon atoms, and $X^{11}$ represents a single bond, an oxygen atom, a sulfur atom, or —N($R^{12}$)—. $R^{12}$ represents a hydrogen atom, an alkyl group, or an aryl group.

$R^{11}$ and $R^{12}$ have the same definitions as R and $R^2$, respectively, and so are the preferable scopes.

$X^{11}$ has the same preferable scope as the preferable scope of X.

The porphyrin dye (specific porphyrin dye) represented by Formula (6) above may be substituted by a substituent, if necessary. The substitution position of the substituent is not particularly limited and, for example, may be at R, $R^1$, and $R^2$. The substitution position may be, in the four pyrrole rings, a position at which —X—R is not substituted.

Particularly, from the viewpoints of improvement in responsiveness and suppression of back flow, it is also preferable that the specific porphyrin dye is substituted by a fluorine atom.

<Additional Components>

The dye composition (or the mixture liquid) according to the invention may contain, as other component, one or more additional components such as a colorant other than the dye described above, a surfactant, an ultraviolet absorbent, or an antioxidant, if necessary.

In a case in which the dye composition (or the mixture liquid) contains an additional component, the content thereof is not particularly limited, but generally, the additional component is used in an amount of about 20% by mass or less with respect to the total mass of the dye composition.

The dye composition of the invention, which is described above, is a dye composition used for electrowetting display.

The dye composition of the invention is particularly preferably used as an oil for use in electrowetting display devices.

A particularly preferable example of a form of this electrowetting display device is a form of an electrowetting display device, which includes a display member having: a first substrate, at least a part of at least one surface of which is electrically conductive; a second substrate disposed so as to face the electrically conductive surface of the first substrate; a hydrophobic insulating film disposed on at least a part of a surface of the first substrate at the side having the electrically conductive surface; an electrically non-conductive oil that is disposed movably on the hydrophobic insulating film between the hydrophobic insulating film and the second substrate, and that is obtained by processing a mixture liquid containing a nonpolar solvent and a dye using an ion exchange resin; and an electrically conductive hydrophilic liquid disposed between the hydrophobic insulating film and the second substrate so as to contact the oil, in which an image is displayed by applying a voltage between the hydrophilic liquid and the electrically conductive surface of the first substrate and by changing the profile of the interface between the oil and the hydrophilic liquid. An electrically conductive part may be provided on both surfaces of the first substrate, and in a case in which an electrically conductive part is provided on both surfaces of the first substrate, two second substrates may be disposed so as to face the respective surfaces.

Such a preferable form is explained in the following section of "Electrowetting Display Device".

<<Electrowetting Display Device>>

Hereinafter, an exemplary embodiment of the electrowetting display device of the invention is explained in detail with reference to the drawings. However, it should be construed that the invention is not limited to the following exemplary embodiment.

An exemplary embodiment of the electrowetting display device of the invention is described in detail with reference to FIG. 1 and FIG. 2. In the present exemplary embodiment, a glass substrate equipped with ITO is used as the first substrate having electrical conductivity, decane is used as the nonpolar solvent that is used for constituting the oil, and an aqueous electrolyte solution is used as the hydrophilic liquid.

As shown in FIG. 1, the electrowetting display device 100 of the present exemplary embodiment is equipped with a substrate (first substrate) 11 having electrical conductivity, a substrate (second substrate) 12 which has electrical conductivity and is disposed so as to face the substrate 11, a hydrophobic insulating film 20 provided on the substrate 11, and a hydrophilic liquid 14 and an oil 16 which are filled in a region which is between the hydrophobic insulating film 20 and the substrate 12 and is compartmented by a silicone rubber wall 22a and a silicone rubber wall 22b. The region which is between the hydrophobic insulating film 20 and the substrate 12 and is compartmented by the silicone rubber wall 22a and the silicone rubber wall 22b is configured as a display member (display cell 30) that performs image display by the movement of the oil 16.

This oil 16 is a dye composition, and is obtained by processing a mixture liquid containing a nonpolar solvent and a dye using an ion exchange resin.

Accordingly, as described above, the responsiveness is improved and the back flow phenomenon is suppressed.

Preferable scope of the dye composition as the oil 16 is as described in the above section of "Dye Composition for Electrowetting Display and Method for Manufacturing the Same".

The substrate 11 has a base material 11a and a conductive film 11b which is provided on the base material 11a and has electrical conductivity, and thus, the substrate 11 is configured such that the whole of the substrate surface exhibits electrical conductivity. Further, the substrate 12 is provided at the position facing the substrate 11. Similar to the substrate 11, the substrate 12 has base material 12a and electrically conductive film 12b, which is provided on the substrate 12a and has electrical conductivity, and thus, the substrate 12 is configured such that the whole of the substrate surface exhibits electrical conductivity. In the present exemplary embodiment, the substrate 11 and the substrate 12 are each constituted of a transparent glass substrate and a transparent ITO film provided on the glass substrate.

The base material 11a and the base material 12a may be formed by using either a transparent material or an opaque material, according to the display form of the device. From the viewpoint of displaying an image, it is preferable that at least one of the base material 11a or the base material 12a has light transmitting property. Specifically, it is preferable that at least one of the base material 11a or the substrate 12 has a transmission factor of 80% or higher (more preferably 90% or higher) over the entire wavelength region of from 380 nm to 770 nm. The upper limit of the transmission factor of at least one of the base material 11a or the substrate 12, over the entire wavelength region of from 380 nm to 770 nm, is preferably 100%.

As the material used for the base material 11a and the base material 12a, for example, a glass substrate (for example, a non-alkali glass substrate, a soda glass substrate, a PYREX (registered trademark) glass substrate, a quartz glass substrate, or the like), a plastic substrate (for example, a polyethylene naphthalate (PEN) substrate, a polyethylene terephthalate (PET) substrate, a polycarbonate (PC) substrate, a polyimide (PI) substrate, or the like), a metal substrate such as an aluminum substrate or a stainless steel substrate, a semiconductor substrate such as a silicone substrate, or the like may be used. Among them, from the viewpoint of light transmitting property, a glass substrate or a plastic substrate is preferable.

Further, as the base material, a TFT substrate provided with a thin film transistor (TFT) can also be used. In this case, a form in which an electrically conductive film is connected to the TFT (namely, a form in which the electrically conductive film is a pixel electrode that is connected to the TFT) is preferable. By having this form, a voltage can be applied individually to every pixel and thus, it becomes possible to realize active driving of the entire image display device, similar to the case of a known liquid crystal display device equipped with a TFT.

In the TFT substrate, the configuration of the TFT, various wirings, a storage capacitor, and the like may be a known configuration. For example, the configuration described in JP-A No. 2009-86668 can be referred to.

The electrically conductive film 11b and the electrically conductive film 12b may be either a transparent film or an opaque film, according to the display form of the device. The term "electrically conductive film" refers to a film having electrical conductivity. The film having electrical conductivity has at least an electrically conductive property capable of applying a voltage, and specifically, refers to a film having the property of the surface resistance of 500Ω/□ or less (preferably 70Ω/□ or less, more preferably 60Ω/ or less, and even more preferably 50Ω/□ or less). The lower limit of the surface resistance of the film having electrical conductivity is preferably 0.001Ω/□.

The electrically conductive film may be either an opaque metal film such as a copper film, or a transparent film. However, from the viewpoint of imparting light transmitting property to perform image display, a transparent electrically conductive film is preferable. It is preferable that the transparent electrically conductive film has a transmission factor of 80% or higher (more preferably 90% or higher) over the entire wavelength region of from 380 nm to 770 nm. Examples of the transparent electrically conductive film include films containing at least one of indium tin oxide (ITO), indium zinc oxide (IZO), tin oxide, indium oxide, zirconium oxide, zinc oxide, cadmium oxide, or magnesium oxide. Among them, as the transparent electrically conductive film, a film containing indium tin oxide (ITO) is preferable, from the viewpoints of the light transmitting property and electrical conductivity.

The content of tin oxide in the film containing ITO is preferably in a range of from 5% by mass to 15% by mass, and more preferably in a range of from 8% by mass to 12% by mass, from the viewpoint of reducing the resistance value.

The specific resistance of the electrically conductive film is not particularly limited and, for example, the specific resistance may be $1.0 \times 10^{-3}$ Ω·cm or less. The lower limit of the specific resistance of the electrically conductive film is preferably $1.0 \times 10^{-5}$ Ω·cm.

Examples of a preferable form include a form in which an independent voltage is applied to each display cell (pixel) by applying an independent voltage to every display pixel (display cell) with regard to the electrically conductive film 11b of the substrate 11, while applying a common voltage to plural display cells that form display pixels with regard to the electrically conductive film 12b of the substrate 12. For this form, the form of a known liquid crystal display device can be referred to.

In the present exemplary embodiment, the substrate 12 is provided as a substrate that has electrical conductivity, similar to the substrate 11, but in another embodiment, the substrate 12 may be a substrate that does not have an electrically conductive film and does not have electrical conductivity, and a voltage may be applied between the electrically conductive film 11b and the hydrophilic liquid 14. In this case, the constitution of the substrate 12 is not particularly limited and, for example, a material exemplified above as the material used for the base material 12a can be used.

The hydrophobic insulating film 20 is provided over the entire surface of the electrically conductive film 11b of the substrate 11, and is at least in contact with the oil 16. This hydrophobic insulating film is mainly in the state of being in contact with the oil, when a voltage is not applied (at the time of image non-display), and when a voltage is applied (at the time of image display), the oil moves on the surface of the hydrophobic insulating film, and the region where the oil does not exist is in a state of being in contact with the hydrophilic liquid.

The term "hydrophobic" refers to a property of exhibiting a contact angle of 60° or more when water is contacted. This contact angle is preferably 70° or more (more preferably 80° or more). The upper limit of the contact angle is preferably 100°.

The contact angle is measured in accordance with the method described in "6. Sessile drop method" in JIS R3257 "Testing method of wettability of glass substrate surface". More specifically, using a contact angle measuring device (trade name: CONTACT ANGLE METER CA-A, manufactured by Kyowa Interface Science Co., Ltd.), a water droplet having a size of 20 mm² is made, then the water droplet is released from the tip of a needle and is brought into contact with the hydrophobic insulating film to form a water droplet, which is allowed to stand for 10 seconds, and thereafter, the shape of the water droplet is observed from the peephole of the contact angle meter, whereby the contact angle θ (at 25° C.) is determined.

The "insulating" used in the term of "insulating film" refers to a property of having a specific resistance of $10^7$ Ω·cm or more, and preferably refers to a property of having a specific resistance of $10^8$ Ω·cm or more (more preferably $10^9$ Ω·cm or more). The upper limit of the specific resistance of the insulating film is preferably $10^{12}$ Ω·cm.

As the hydrophobic insulating film, an insulating film that exhibits affinity with the oil 16 and has low affinity with the hydrophilic liquid 14 can be used. However, from the viewpoint of suppressing the deterioration of film caused by the movement of oil due to repeatedly performing application of voltage, a film which has a crosslinking structure derived from a polyfunctional compound is preferable. In particular, the hydrophobic insulating film is more preferably a film which has a crosslinking structure derived from a polyfunctional compound having two or more polymerizable groups. The crosslinking structure is preferably formed by polymerization using at least one polyfunctional compound (if necessary, together with other monomer).

In the present exemplary embodiment, the hydrophobic insulating film includes a copolymer obtained by copolymerization using a 5-membered cyclic perfluorodiene.

The polyfunctional compound is a compound having two or more polymerizable groups in a molecule thereof. Examples of the polymerizable groups include radical-polymerizable groups, cation-polymerizable groups, and condensation-polymerizable groups. In particular, a (meth)acryloyl group, an allyl group, an alkoxysilyl group, an α-fluoroacryloyl group, an epoxy group, —C(O)OCH=CH$_2$, and the like are preferable. The two or more polymerizable groups included in the polyfunctional compound may be the same or different from each other.

In the formation of the crosslinking structure, the polyfunctional compounds may be used singly or in combination of two or more kinds thereof.

As the polyfunctional compound, a known polyfunctional polymerizable compound (a radical-polymerizable compound, a cation-polymerizable compound, a condensation-polymerizable compound, or the like) can be used. Examples of the polyfunctional compound include polyfunctional acrylates such as ethylene glycol di(meth)acrylate, diethylene glycol di(meth)acrylate, polyethylene glycol di(meth)acrylate, 1,6-hexanediol di(meth)acrylate, ethoxylated 1,6-hexanediol diacrylate, neopentyl glycol di(meth)acrylate, ethoxylated neopentyl glycol di(meth)acrylate, propoxylated neopentyl glycol di(meth)acrylate, tripropylene glycol di(meth)acrylate, polypropylene glycol diacrylate, 1,4-butanediol di(meth)acrylate, 1,9-nonanediol diacrylate, tetraethylene glycol diacrylate, 2-n-butyl-2-ethyl-1,3-propanediol diacrylate, dimethylol tricyclodecane diacrylate, hydroxypivalic acid neopentyl glycol diacrylate, 1,3-butylene glycol di(meth)acrylate, ethoxylated bisphenol A di(meth)acrylate, propoxylated bisphenol A di(meth)acrylate, cyclohexane dimethanol di(meth)acrylate, dimethyloldicyclopentane diacrylate, trimethylolpropane triacrylate, ethoxylated trimethylolpropane triacrylate, propoxylated trimethylolpropane triacrylate, pentaerythritol triacrylate, tetramethylolpropane triacrylate, tetramethylolmethane triacrylate, pentaerythritol tetraacrylate, caprolactone modified trimethylolpropane triacrylate, ethoxylated isocyanuric acid triacrylate, tri(2-hydroxyethyl isocyanurate) triacrylate, propoxylate glyceryl triacrylate, tetramethylolmethane tetraacrylate, pentaerythritol tetraacrylate, ditrimethylolpropane tetraacrylate, ethoxylated pentaerythritol tetraacrylate, dipentaerythritol hexaacrylate, neopentyl glycol oligoacrylate, 1,4-butanediol oligoacrylate, 1,6-hexanediol oligoacrylate, trimethylolpropane oligoacrylate, pentaerythritol oligoacrylate, urethane acrylate, epoxy acrylate, and polyester acrylate.

As the polyfunctional compound other than the above compounds, a polyfunctional polymerizable compound can be selected as appropriate from known polymerizable compounds described in, for example, paragraphs 0031 to 0035 of JP-A No. 2008-181067, paragraphs 0149 to 0155 of JP-A No. 2008-139378, paragraphs 0142 to 0146 of JP-A No. 2010-134137, and the like, and used.

It is preferable that the polyfunctional compound has three or more (preferably four or more, and more preferably five or more) polymerizable groups in a molecule thereof. Herewith, the density of the crosslinking structure in the film can be further increased, and therefore, the deterioration of the hydrophobic insulating film, when application of voltage is repeatedly performed, may be further suppressed.

The polyfunctional compound is preferably a fluorine-containing compound, and more preferably a polyfunctional compound in which the fluorine content is 35% by mass or higher (preferably 40% by mass or higher, and more preferably 45% by mass or higher) based on the molecular weight. When the polyfunctional compound includes a fluorine atom (specifically, when the fluorine content is 35% by mass or higher based on the molecular weight), the hydrophobicity of the hydrophobic insulating film is further enhanced. There is no particular limitation as to the upper limit of the fluorine content in the polyfunctional compound, but the upper limit may be, for example, 60% by mass (preferably 55% by mass, and more preferably 50% by mass) based on the molecular weight.

Concerning the fluorine-containing compound that serves as the polyfunctional compound, a fluorine-containing compound described in, for example, paragraphs 0007 to 0032 of JP-A No. 2006-28280 can be used.

The method of polymerizing the polyfunctional compound is preferably bulk polymerization or solution polymerization.

Examples of a method of initiating polymerization include a method using a polymerization initiator (for example, a radical initiator), a method of irradiating with light or a radiation, a method of adding an acid, a method of adding a photo acid generator and then irradiating with light, and a method of heating to undergo dehydration condensation. These polymerization methods and polymerization initiation methods are described in, for example, "Kobunshi Gosei Hoho (Polymer Synthesis Method)" by Teiji Tsuruta, revised edition (published by Nikkan Kogyo Shimbun, Ltd., 1971) and "Kobunshi Gosei no Jikkenho (Experimental Technique of Polymer Synthesis)" by Takayuki Ohtu and Masaetu Kinoshita, Kagaku-Dojin Publishing Company Inc., 1972, pages 124 to 154.

The hydrophobic insulating film is preferably prepared by using a curable composition which includes the polyfunctional compound. One kind or two or more kinds of polyfunctional compounds may be included in the curable composition. The curable composition may further include a monofunctional compound. As the monofunctional compound, a known monofunctional monomer can be used.

The content of the polyfunctional compound (in the case of using two or more kinds thereof, the total content; hereinafter the same applies) in the curable composition is not particularly limited, but from the viewpoint of curability, the content of the polyfunctional compound is preferably 30% by mass or higher, more preferably 40% by mass or higher, and particularly preferably 50% by mass or higher, with respect to the total solids of the curable composition. The upper limit of the content of the polyfunctional compound (in the case of using two or more kinds thereof, the total content; hereinafter the same applies) in the curable composition is preferably 80% by mass. Here, the term "total solids" refers to all components except solvent.

It is preferable that the curable composition further includes at least one solvent. Examples of the solvent include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, 1-butanol, propylene glycol monomethyl ether, propylene glycol monomethyl ether acetate, cyclohexanone, cyclohexanol, ethyl lactate, methyl lactate, and caprolactam.

The content of the solvent (in the case of using two or more kinds thereof, the total content) in the curable composition is preferably from 20% by mass to 90% by mass, more preferably from 30% by mass to 80% by mass, and particularly preferably from 40% by mass to 80% by mass, with respect to the total mass of the curable composition.

It is preferable that the curable composition further includes at least one polymerization initiator. As the polymerization initiator, a polymerization initiator that generates a radical by the action of at least one of heat or light is preferable.

Examples of a polymerization initiator that initiates radical polymerization by the action of heat include an organic peroxide, an inorganic peroxide, an organic azo compound, and a diazo compound. Examples of the organic peroxide include benzoyl peroxide, halogenbenzoyl peroxide, lauroyl peroxide, acetyl peroxide, dibutyl peroxide, cumene hydroperoxide, and butyl hydroperoxide. Examples of the inorganic peroxide include hydrogen peroxide, ammonium peroxodisulfate, and potassium peroxodisulfate. Examples of the organic azo compound include 2-azo-bis-isobutyronitrile, 2-azo-bis-propionitrile, and 2-azo-bis-cyclohexane dinitrile. Examples of the diazo compound include diazoaminobenzene and p-nitrobenzene diazonium.

Examples of a polymerization initiator that initiates radical polymerization by the action of light include compounds such as hydroxyalkylphenones, aminoalkylphenones, acetophenones, benzoins, benzophenones, phosphine oxides, ketals, anthraquinones, thioxanthones, azo compounds, peroxides, 2,3-dialkyldione compounds, disulfide compounds, fluoroamine compounds, or aromatic sulfoniums.

Examples of the hydroxyalkylphenones include 2-hydroxy-2-methyl-1-phenyl-1-propan-1-one, 1-hydroxycyclohexyl phenyl ketone, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 1-hydroxydimethyl phenyl ketone, and 1-hydroxycyclohexyl phenyl ketone.

Examples of the aminoalkylphenones include 2-dimethylamino-2-(4-methylbenzyl)-1-(4-morpholin-4-ylphenyl) butan-1-one, 2-benzyl-2-dimethylamino-1-(4-morpholinophenyl)-butanone-1, and 2-methyl-1-(4-methylthio phenyl)-2-morpholinopropan-1-one.

Examples of the acetophenones include 2,2-diethoxyacetophenone and p-dimethylacetophenone.

Examples of the benzoins include benzoin benzenesulfonic acid ester, benzoin toluenesulfonic acid ester, benzoin methyl ether, benzoin ethyl ether, and benzoin isopropyl ether.

Examples of the benzophenones include benzophenone, 2,4-dichlorobenzophenone, 4,4-dichlorobenzophenone, and p-chlorobenzophenone.

Examples of the phosphine oxides include 2,4,6-trimethylbenzoyldiphenylphosphine oxide.

Further, a sensitizing dye can also be used in combination with the above polymerization initiator.

The content of the polymerization initiator is not particularly limited, but the content is preferably from 0.1% by mass to 15% by mass, more preferably from 0.5% by mass to 10% by mass, and particularly preferably from 2% by mass to 5% by mass, with respect to the total solids of the curable composition.

The curable composition may include one or more additional components, if necessary. Examples of the additional components include inorganic oxide particles, a silicone based antifouling agent or a fluorine-containing antifouling agent, a slipping agent, a polymerization inhibitor, a silane coupling agent, a surfactant, a thickener, and a leveling agent.

In a case in which the curable composition includes an additional component, the content of the additional component is preferably in a range of from 0% by mass to 30% by mass, more preferably in a range of from 0% by mass to 20% by mass, and particularly preferably in a range of from 0% by mass to 10% by mass, with respect to the total solids of the curable composition.

The film thickness of the hydrophobic insulating film is not particularly limited, but the film thickness is preferably from 50 nm to 10 μm, and more preferably from 100 nm to 1 μm. The film thickness of the hydrophobic insulating film being within the above range is preferable in view of the balance between the insulation property and the drive voltage.

—Method of Forming Hydrophobic Insulating Film—

The hydrophobic insulating film can be preferably prepared by the following method. Namely, the method of forming a hydrophobic insulating film includes a curable layer forming step of applying the curable composition containing the polyfunctional compound onto the surface of the substrate 11, onto which electrical conductivity has been applied (in the present exemplary embodiment, the surface of the electrically conductive film 11b of the substrate 11), to form a curable layer, and a curing step of polymerizing the polyfunctional compound in the curable layer thus formed, to cure the curable layer. By such a method, a hydrophobic insulating film having a crosslinking structure is formed.

In the case of forming, on the substrate 11, the hydrophobic insulating film 20, which serves as the curable layer, a known coating method or transfer method can be used.

In the case of using a coating method, the curable composition is coated on the substrate 11 (and further, is preferably dried) to form a curable layer. As the coating method, for example, a known method such as a spin coating method, a slit coating method, a dip coating method, an air knife coating method, a curtain coating method, a roller coating method, a wire bar coating method, a gravure coating method, or an extrusion coating method can be used.

In the case of using a transfer method, a transfer material having a curable layer, which is formed by using the curable composition, is prepared in advance, and the curable layer of the transfer material is transferred onto the substrate 11, whereby a curable layer is formed on the substrate 11. For the details on the transfer method, description in, for example, paragraphs 0094 to 0121 of JP-A No. 2008-202006 or paragraphs 0076 to 0090 of JP-A No. 2008-139378 can be referred to.

Curing of the curable layer (polymerization of the polyfunctional compound) can be carried out, for example, by at least one of irradiation (hereinafter, may also be referred to as "exposure") with an actinic energy ray or heating.

As the actinic energy ray used for the exposure, for example, ultraviolet ray (g line, h line, i line, or the like), electron beam, or X-ray is preferably used. The exposure may be carried out by using a known exposure device of a proximity system, a mirror projection system, a stepper system, or the like. The exposure value in the exposure may be, for example, from 10 mJ/cm$^2$ to 2,000 mJ/cm$^2$, and is preferably from 50 mJ/cm$^2$ to 1,000 mJ/cm$^2$.

By exposing through a prescribed photomask in the exposure and subsequently developing using a developing liquid such as an alkali solution, it is possible to obtain a hydrophobic insulating film which is patterned in a desired pattern.

Further, heating can be carried out by a known method using, for example, a hot plate or an oven. The heating temperature can be set appropriately, and the heating temperature may be, for example, from 100° C. to 280° C., and is preferably from 150° C. to 250° C. The heating time can also be set appropriately, and the heating time may be, for example, from 2 minutes to 120 minutes, and is preferably from 5 minutes to 60 minutes.

In the present exemplary embodiment, the hydrophilic liquid 14 and the oil 16 are injected in the region between the hydrophobic insulating film 20 and the substrate 12.

Figure 2:
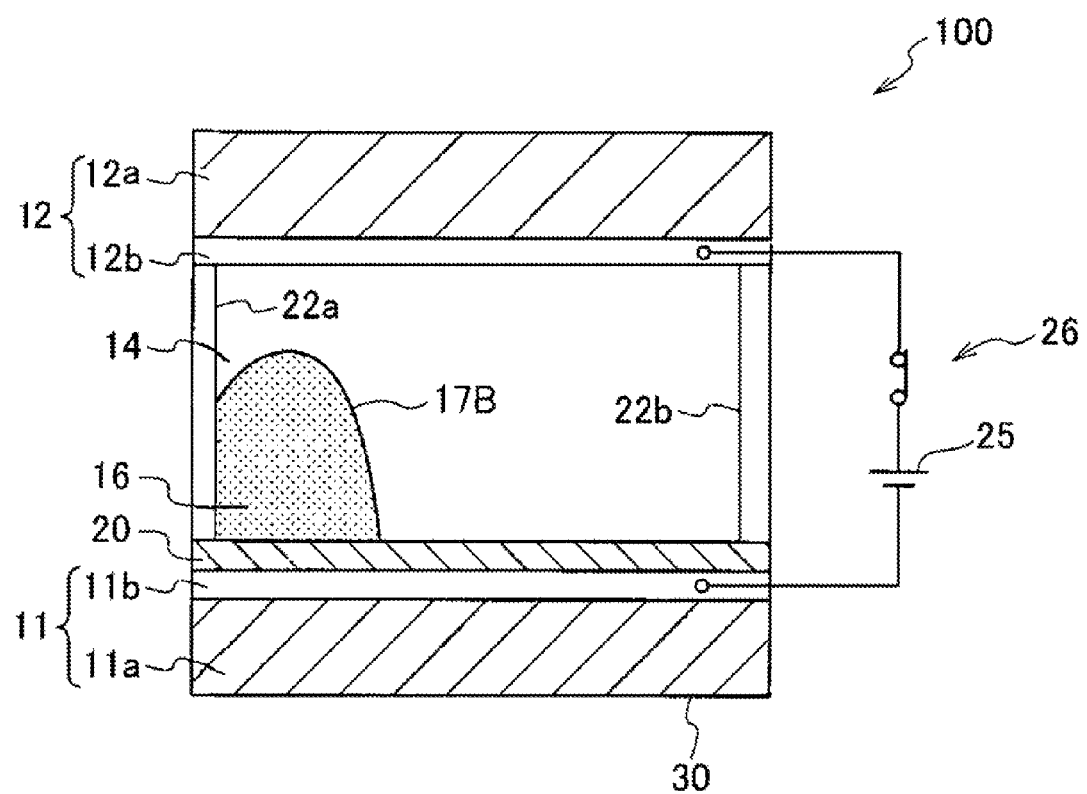
FIG. 2 is a schematic sectional view illustrating a voltage-on state of the electrowetting display device according to an exemplary embodiment of the invention.

The hydrophilic liquid 14 and the oil 16 are liquids which do not mix with each other, and are separated from each other by interface 17A or interface 17B as shown in FIG. 1 and FIG. 2. It should be noted that, in FIG. 1 and FIG. 2, the interface 17A represents the interface between the hydrophilic liquid 14 and the oil 16 in the voltage-off state, and the interface 17B represents the interface between the hydrophilic liquid 14 and the oil 16 in the voltage-on state.

Next, the hydrophilic liquid 14 is explained.

The hydrophilic liquid 14 is an electrically conductive hydrophilic liquid. The term "electrically conductive" refers to a property of having a specific resistance of $1 \times 10^5$ $\Omega \cdot$cm or less (preferably $10^4$ $\Omega \cdot$cm or less). The lower limit of the specific resistance of the electrically conductive hydrophilic liquid is preferably $1 \times 10^{-2}$ $\Omega \cdot$cm.

The hydrophilic liquid includes an aqueous solvent and, if necessary, further includes an electrolyte.

Examples of the electrolyte include salts such as sodium chloride, potassium chloride, or tetrabutylammonium chloride. The concentration of the electrolyte in the hydrophilic liquid is preferably from 0.1 mol/L to 10 mol/L, and more preferably from 0.1 mol/L to 5 mol/L.

It is preferable that the aqueous solvent include at least one of water or alcohol. Examples of the alcohol include ethanol, ethylene glycol, and glycerin.

The aqueous solvent may include one or more components other than water or alcohol.

From the viewpoint of responsiveness, it is preferable that the aqueous solvent does not substantially include a surfactant.

In the electrowetting display device 100, an electric power supply 25 (a voltage application means) for applying a voltage between the electrically conductive film 11b and the electrically conductive film 12b through the hydrophilic liquid 14, and a switch 26 for turning on/off this voltage are electrically connected.

In the present exemplary embodiment, application of a voltage (potential) to the hydrophilic liquid 14 can be carried out by applying a voltage to the electrically conductive film 12b provided on the substrate 12. As described above, in the present exemplary embodiment, a surface of the substrate 12, the surface being at the side that contacts the hydrophilic liquid 14, has electrical conductivity (for example, an ITO film as an electrically conductive film exists on a side of the base material 12a, the side contacting the hydrophilic liquid 14), but the invention is not limited to this form. For example, the application of a voltage (potential) to the hydrophilic liquid 14 may be carried out by using an electrode which is inserted in the hydrophilic liquid 14, without providing electrically conductive film 12b on the substrate 12.

Next, the actions (the voltage-off state and the voltage-on state) of the electrowetting display device 100 are described.

As shown in FIG. 1, in the state of voltage being not applied, since the affinity between the hydrophobic insulating film 20 and the oil 16 is high, the oil 16 is in a state of being in contact with the entire surface of the hydrophobic insulating film 20. When the switch 26 of the electrowetting display device 100 is turned on to perform application of a voltage, the interface between the hydrophilic liquid 14 and the oil 16 transforms from the interface 17A of FIG. 1 to the interface 17B shown in FIG. 2. In this process, the contact area between the hydrophobic insulating film 20 and the oil 16 is reduced and, as shown in FIG. 2, the oil 16 moves to the edge of the cell. This phenomenon is a phenomenon which is caused when a charge is generated on the surface of the hydrophobic insulating film 20 by the application of a voltage, and due to this charge, the hydrophilic liquid 14 pushes the oil 16 that has been in contact with the hydrophobic insulating film 20 and, as a result, the hydrophilic liquid 14 is brought into contact with the hydrophobic insulating film 20.

When the switch 26 of the electrowetting display device 100 is turned off to be in the state of voltage being not applied, the electrowetting display device 100 returns to be in the state of FIG. 1.

In the electrowetting display device 100, the actions shown in FIG. 1 and FIG. 2 are performed, repeatedly.

In the above description, an exemplary embodiment of the electrowetting display device is explained with reference to FIG. 1 and FIG. 2; however, the invention is not limited to the present exemplary embodiment.

For example, in FIG. 1 and FIG. 2, the electrically conductive film 11b is disposed over the entire surface of the base material 11a in the substrate 11; however, a form in which the electrically conductive film 11b is disposed only on a part of the surface of the base material 11a may be employed. Further, in the substrate 12, the electrically conductive film 12b is provided over the entire surface of the base material 12a; however, a form in which the electrically conductive film 12b is disposed only on a part of the surface of the base material 12a may be employed.

In an exemplary embodiment, by adding one or more dyes to the oil 16, to color the oil to have a desired color (for example, black, red, green, blue, cyan, purple, magenta, yellow, or the like; preferably, cyan, purple, or yellow), the oil can function as a pixel of an electrowetting display device which performs image display. In this case, the oil 16 functions, for example, as an optical shutter that changes the on state and off state of the pixel. In this case, the electrowetting display device may be of any system of a transmission type, a reflection type, or a semi-transmission type.

The electrowetting display device in the present exemplary embodiment may have an ultraviolet ray cut-off layer on the outer side (the side opposite to the surface that faces the oil) of at least one of the first substrate or the second substrate. By having such a configuration, the lightfastness of the display device can be further improved.

As the ultraviolet ray cut-off layer, a known substance can be used and, for example, an ultraviolet ray cut-off layer (for example, an ultraviolet ray cut-off film) containing an ultraviolet absorbent can be used. It is preferable that the ultraviolet ray cut-off layer absorbs 90% or more of light having a wavelength of 380 nm. The upper limit of the absorption of light having a wavelength of 380 nm in the ultraviolet ray cut-off layer is preferably 100%.

The ultraviolet ray cut-off layer can be provided at the outer side of at least one of the first substrate or the second substrate by a known method, for example, a method of pasting using an adhesive or the like.

In the electrowetting display device, by considering the structure shown in FIG. 1 (a region (display cell) obtained by compartmenting the region between the hydrophobic insulating film 20 and the substrate 12 with the silicone rubber wall 22a and the silicone rubber wall 22b, for example, in a lattice-like shape) as one pixel of a display member, and by two-dimensionally arranging two or more of the above display cells, it becomes possible to display an image. In this case, the electrically conductive film 11b may be a film which is patterned independently for every one pixel (display cell) (for example, the case of an active matrix type image display device or the like), or may be a film which is patterned in a striped shape lying across plural pixels (display cells) (for example, the case of a passive matrix type image display device or the like).

In the electrowetting display device 100, by using, as the base material 11a and the base material 12a, a substrate having light transmitting property such as glass or plastic (polyethylene terephthalate, polyethylene naphthalate, or the like), and also using a film having light transmitting property as the electrically conductive films 11b and 12b and the hydrophobic insulating film 20, a transmission type display device can be prepared. In the pixel of this transmission type display device, by providing a reflective plate at the outside of the display cell, a reflection type display device can also be prepared.

Further, for example, by using, as the electrically conductive film 11b, a film having an additional function as a reflective plate (for example, a metal film such as an Al film or an Al alloy film), or using, as the base material 11a, a substrate having an additional function as a reflective plate (for example, a metal substrate such as an Al substrate or an Al alloy substrate), a pixel of a reflection type image display device can also be prepared.

The other configuration of the display cell that constitutes the electrowetting display device 100 of the present exemplary embodiment or the image display device may be a known configuration described in, for example, JP-A Nos. 2009-86668 and H10-39800, Japanese Patent Application National Publication (JP-A) No. 2005-517993, JP-A Nos. 2004-252444 and 2004-287008, JP-A Nos. 2005-506778 and 2007-531917, JP-A No. 2009-86668, and the like. Further, the configuration of a known active matrix type or passive matrix type liquid crystal display device can also be referred to.

The electrowetting display device may be constituted, if necessary, by using the same member as the member of a known liquid crystal display device, such as a back light, a spacer for adjusting the cell gap, or a sealant for sealing, in addition to the display cell (display pixel). In this case, for example, the oil and the hydrophilic liquid may be applied to the region compartmented by the silicone rubber walls on the substrate 11, by an inkjet method.

An example of a method for manufacturing the electrowetting display device 100 of the present exemplary embodiment is a method including a substrate preparing step of preparing the substrate 11; a step of forming the hydrophobic insulating film 20 at the side of the electrically conductive surface of the substrate 11; a partitioning wall forming step of forming a partitioning wall that compartments a region above the hydrophobic insulating film 20 forming face of the substrate 11; an application step of applying (for example, by an inkjet method) the oil 16 and the hydrophilic liquid 14 to the region compartmented by the partitioning wall; and a cell forming step of placing the substrate 12 on a side of the substrate 11 after the application step, the side having been applied with the oil 16 and the hydrophilic liquid 14, to form a cell (display member); and, if necessary, a sealing step of sealing the cell by joining the substrate 11 and the substrate 12 at the circumference of the cell. The joining of the substrate 11 and the substrate 12 can be conducted by using a sealant which is generally used in the production of liquid crystal display devices.

Further, a spacer forming step of forming a spacer for adjusting the cell gap may be provided, after the partitioning wall forming step but before the cell forming step.

EXAMPLES

Hereinafter, the present invention is specifically described with reference to Examples; however, the invention is by no means limited to the following Examples unless they are beyond the spirit of the invention.

Example 1

Synthesis of Dye 1 (Methine Dye)

Dye 1, which is a methine dye, was synthesized in accordance with the following scheme.

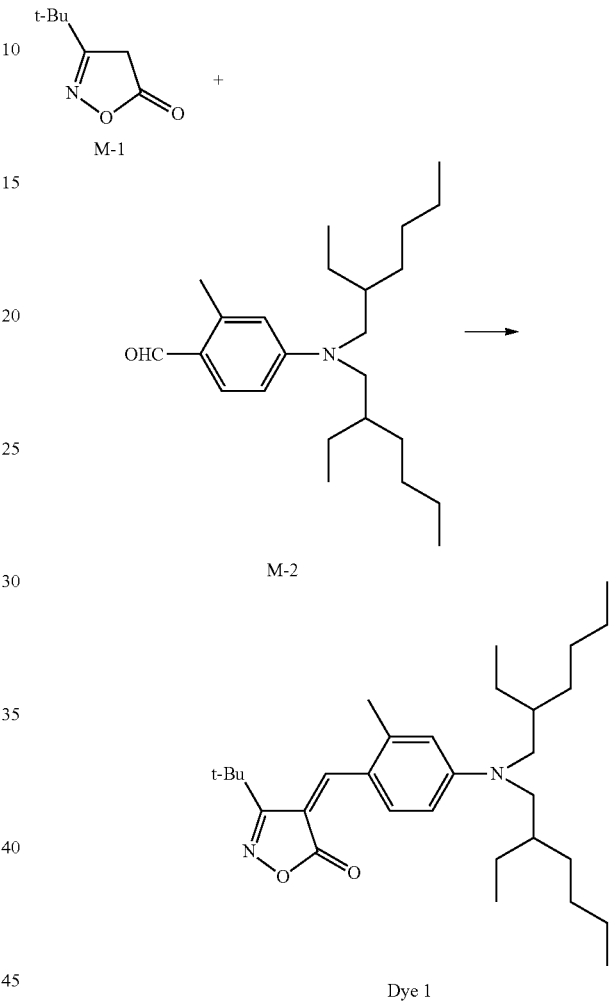

Details of the above scheme are as follows.

Compound M-1 (2.8 g) as shown above as a raw material and the above compound M-2 (7.1 g) as a raw material were added to a mixed solution of ethanol (20 mL) and acetic acid (2 mL) and, while stirring, the mixture liquid was heated under reflux for 2 hours. Then, the solution that had been heated under reflux was cooled.

Subsequently, water was added to the solution that had been cooled, and the organic substance was extracted with ethyl acetate.

The extracted liquid (organic phase) was dried over sodium sulfate, and then the solvent was distilled off under reduced pressure. The residue was purified by silica gel column chromatography (eluent: hexane+ethyl acetate) to obtain the above dye 1, which is a methine dye.

<Preparation of Ink 1 (Dye Composition) and Quantification of Sodium Ion (Na Ion)>

The dye 1 (400 mg) obtained as described above was dissolved in 600 mg of normal decane.

To the mixture liquid thus obtained, AMBERLYST 15 (trade name, manufactured by Sigma-Aldrich Corporation)

(200 mg), as a cation exchange resin, was added under room temperature, and the resulting mixture liquid was stirred for 30 minutes under room temperature.

Subsequently, by filtration, the cation exchange resin was removed from the mixture liquid that had been stirred, thereby obtaining ink 1 which is an example of the dye composition (oil) of the invention.

With regard to ink 1, ion chromatography analysis was conducted to carry out quantification of Na ion and, as a result, the Na ion content with respect to the total amount of ink 1 was less than 1 ppm.

<Preparation of Ink 2 (Dye Composition for Comparison) and Quantification of Na Ion>

Preparation of ink 2, which is a dye composition (oil) for comparison, was conducted in the same manner as that in the preparation of ink 1, except that the operation of adding a cation exchange resin and the operations thereafter were not conducted.

With regard to ink 2 thus obtained, ion chromatography analysis was conducted to carry out quantification of Na ion and, as a result, the Na ion content with respect to the total amount of ink 2 was 120 ppm.

<Measurement of Voltage Retention Ratio of Inks 1 and 2>

A glass substrate which has a size of 10 mm×10 mm and has an indium tin oxide (ITO) electrode (with a thickness of 100 nm) formed thereon was prepared, and on this ITO electrode, a polyimide orientation film was formed by coating. Then, on the polyimide orientation film that had been formed by coating, a spacer of 8 µm was sprayed.

Subsequently, the glass substrate, on which the spacer had been sprayed, and a substrate (opposing substrate) which has a size of 10 mm×10 mm and has an ITO electrode formed thereon was pasted together such that the ITO electrode faced the spacer side, thereby preparing a cell for measuring the voltage retention ratio.

Into the thus obtained cell for measuring the voltage retention ratio, ink 1 or ink 2 was injected, and the voltage retention ratio (%) was measured.

The conditions for the measurement of voltage retention ratio (%) were as follows: an applied voltage pulse amplitude of 5 V, an applied voltage pulse frequency of 60 Hz, and an applied voltage pulse width of 16.7 msec.

As a result, the voltage retention ratio of ink 1 was 89%, and the voltage retention ratio of ink 2 was 21%.

<Preparation of Test Cell>

On a surface of the ITO film of a glass substrate (10 mm×10 mm) equipped with an indium tin oxide (ITO) film with a thickness of 100 nm as a transparent electrode, a fluorine-containing polymer (trade name: CYTOP, manufactured by Asahi Glass Co., Ltd., model number: CTL-809M) was coated such that the thickness was 600 nm, thereby forming a fluorine-containing polymer layer, to form a hydrophobic insulating film. Subsequently, on this fluorine-containing polymer layer, a frame-shaped silicone rubber wall which had been prepared by cutting out a tetrahedron having a size of 8 mm×8 mm×50 µm from the middle of a silicone rubber having a size of 1 cm×1 cm (a sealant having a thickness of 50 µm; SILI-US (trade name), manufactured by Fuso Rubber Co., Ltd.) was placed to form a display member. Into the region enclosed by this silicone rubber wall, ink 1 or ink 2 obtained as described above was injected such that the thickness was 4 µm. On the ink that had been injected, ethylene glycol (a hydrophilic liquid) was injected such that the thickness was 46 µm. On this assembly, a glass substrate equipped with an ITO film was further placed such that the ITO film faced the dye ink or the ethylene glycol, and was fixed. In this way, an electrowetting test cell having a structure shown in FIG. 1 was prepared.

<Evaluation>

To each of the ITO films (transparent electrodes) of the two glass substrates each equipped with an ITO film, a DC voltage of 100 V was applied (a minus voltage was applied to the ITO electrode on the side having thereon the fluorine-containing polymer layer (hydrophobic insulating film)) by using a signal generator, and the display cell (display cell 30 in FIG. 2) was observed. As a result, it was confirmed that the dye ink had moved toward one direction on the surface of the fluorine-containing polymer layer, and the area of the dye ink that covers the fluorine-containing polymer layer was reduced.

The responsiveness (the response time and area shrinkage factor described below) of the dye ink in this process, and the degree of the back flow phenomenon (the back flow ratio described below) when kept in the state of voltage being applied were evaluated.

The evaluation results are shown in Table 1 below.

The reduction of the area by application of a voltage was evaluated based on the area shrinkage factor [%] calculated according to the following Equation (1), and the back flow phenomenon was evaluated based on the back flow ratio [%] calculated according to the following Equation (2).

a) Response time [msec]=Time needed to reach the most shrunken state from the time point of initiation of voltage application, when the application of a voltage is initiated from the state of voltage being not applied b) Area shrinkage factor [%]=(Area of the dye ink when the dye ink shrinks at the most)/(Area of the dye ink before application of voltage)×100 (1)

c) Back flow ratio [%]=(Area of the dye ink after 5 seconds have past in the state of voltage being applied)/(Area of the dye ink when the dye ink shrinks at the most)×100 (2)

TABLE 1

[Dye concentration: 40% by mass]

| | | | Responsiveness | | | |
| | | | Area | | | |
| No. | Ink Kind | Na Ion Content | Shrinkage Factor [%] | Response Time | Back Flow Ratio [%] | Note |
| --- | --- | --- | --- | --- | --- | --- |
| 1 | Ink 1 | less than 1 ppm | 15 | less than 200 msec | 100 | Invention |
| 2 | Ink 2 | 120 ppm | 90 | more than 1 sec | Unmeasurable | Comparative |

*When the area shrinkage factor is 100%, it is meant that the area is not shrunk.

As shown in Table 1, when using ink 1 which is the dye composition of the invention, remarkably excellent responsiveness was exhibited and the back flow phenomenon was remarkably suppressed, as compared with the case of using ink 2 which is the dye composition for comparison.

Example 2

Synthesis of Dye 2 (Azomethine Dye)

Dye 2, which is an azomethine dye, was synthesized in accordance with the following scheme.

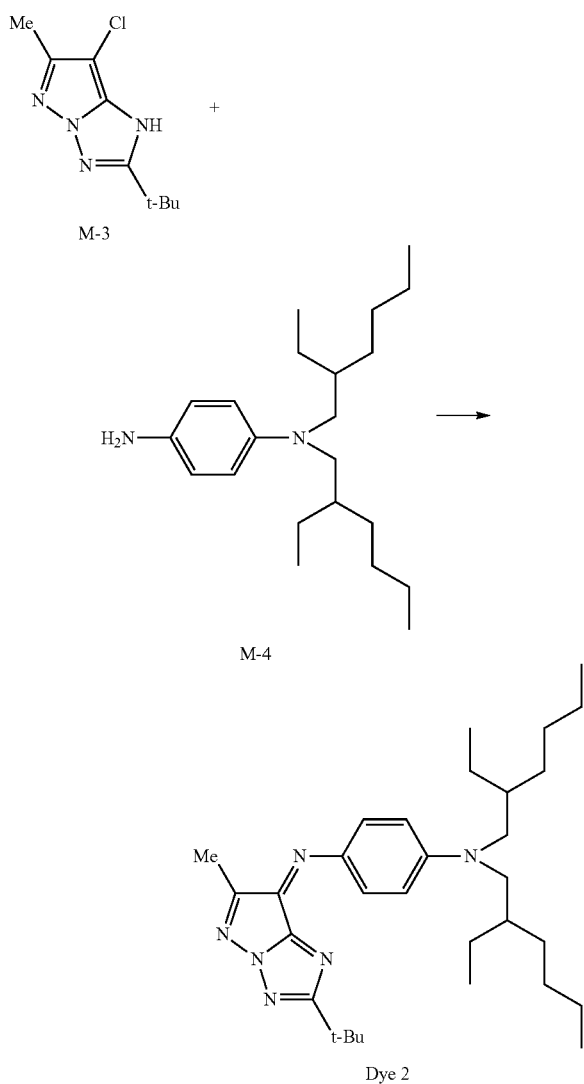

Details of the above scheme are as follows.

Compound M-3 (3.3 g) as shown above as a raw material and sodium carbonate (15 g) were added to a mixed solution of ethyl acetate (60 mL) and water (50 mL). Further, to the solution thus obtained, compound M-4 (4.5 g) as shown above as a raw material and ammonium peroxodisulfate (2.8 g) were added. The resulting mixture liquid was stirred for 3 hours under room temperature. Water was added to the solution that had been stirred, and further, the organic substance was extracted with ethyl acetate.

The extracted liquid (organic phase) was dried over sodium sulfate, and then the solvent was distilled off under reduced pressure. The residue was purified by silica gel column chromatography (eluent: hexane+ethyl acetate) to obtain dye 2, which is an azomethine dye.

<Preparation of Ink 3 (Dye Composition) and Quantification of Na Ion>

Preparation of ink 3, which is an example of the dye composition (oil) of the invention, was conducted in the same manner as that in the preparation of ink 1, except that, the dye 1 in the preparation of ink 1 in Example 1 was changed to dye 2, which was obtained as described above.

With regard to ink 3, ion chromatography analysis was conducted to carry out quantification of Na ion and, as a result, the Na ion content with respect to the total amount of the ink 3 was less than 1 ppm.

<Preparation of Ink 4 (Dye Composition for Comparison) and Quantification of Na Ion>

Preparation of ink 4, which is a dye composition (oil) for comparison, was conducted in the same manner as that in the preparation of ink 3, except that the operation of adding a cation exchange resin and the operations thereafter were not conducted.

With regard to ink 4 thus obtained, ion chromatography analysis was conducted to carry out quantification of Na ion and, as a result, the Na ion content with respect to the total amount of ink 4 was 160 ppm.

<Measurement of Voltage Retention Ratio of Inks 3 and 4>

With regard to each of inks 3 and 4, the voltage retention ratio was measured in the same manner as the measurement of voltage retention ratio of inks 1 and 2 in Example 1.

As a result, the voltage retention ratio of ink 3 was 95%, and the voltage retention ratio of ink 4 was 18%.

<Preparation of Test Cell and Evaluation>

Preparation of a test cell was conducted in the same manner as that in Example 1, except that, the ink used in the preparation of the test cell in Example 1 was changed to ink 3 or ink 4, and evaluation was performed in the same manner as that in Example 1.

The evaluation results are shown in the following Table 2.

TABLE 2

| | | [Dye concentration: 40% by mass] | | | |
|---|---|---|---|---|---|
| | Ink | | Responsiveness | | |
| No. | Kind | Na Ion Content | Area Shrinkage Factor [%] | Response Time | Back Flow Ratio [%] | Note |
| 1 | Ink 3 | less than 1 ppm | 12 | less than 200 msec | 100 | Invention |
| 2 | Ink 4 | 160 ppm | 80 | from 200 msec to 1 sec | 140 | Comparative |

*When the area shrinkage factor is 100%, it is meant that the area is not shrunk.

As shown in Table 2, when using ink 3 which is the dye composition of the invention, remarkably excellent responsiveness was exhibited and the back flow phenomenon was remarkably suppressed, as compared with the case of using ink 4 which is the dye composition for comparison.

Reference Example 1

For the purpose of examining the relationships between the Na ion content in ink and the voltage retention ratio, the responsiveness, and the back flow phenomenon, the relationships between the Na ion content in a liquid example and the voltage retention ratio, the responsiveness, and the back flow phenomenon were examined as described below.

Sodium dodecylbenzenesulfonate was added in various addition amounts to normal decane. The mixture liquids were each subjected to an ultrasonic dispersion treatment (room temperature, for 30 minutes), and were left to stand for one day, to obtain Liquid Samples 1 to 4, respectively.

Further, normal decane (sodium dodecylbenzenesulfonate was not added) was prepared as Liquid Sample 5.

With regard to each of the liquid samples, the supernatant was extracted, and the Na ion content was measured by ion chromatography.

Further, with regard to each of the liquid samples, the voltage retention ratio was measured in the same manner as the measurement of the voltage retention ratio of inks 1 and 2 in Example 1.

Moreover, preparation of a test cell was conducted in the same manner as that in Example 1, except that, the ink used in the preparation of the test cell in Example 1 was changed to one of the liquid samples, and evaluation was performed in the same manner as that in Example 1.

The evaluation results are shown in the following Table 3.

TABLE 3

| Liquid Sample | Na Ion Content | Voltage Retention Ratio | Responsiveness | | Back Flow Ratio [%] |
|---|---|---|---|---|---|
| | | | Area Shrinkage Factor [%] | Response Time | |
| Liquid Sample 1 | 320 ppm | 16% | 75 | from 200 msec to 1 sec | 150 |
| Liquid Sample 2 | 120 ppm | 22% | 56 | from 200 msec to 1 sec | 140 |
| Liquid Sample 3 | 20 ppm | 42% | 44 | from 200 msec to 1 sec | 140 |
| Liquid Sample 4 | 1 ppm | 98% | 11 | less than 200 msec | 100 |
| Liquid Sample 5 (Decane) | less than 1 ppm | 99% | 11 | less than 200 msec | 100 |

As shown in Table 3, when using Liquid Sample 4 or 5 which had an Na ion content with respect to the total liquid amount of 10 ppm or less, excellent voltage retention ratio and excellent responsiveness were exhibited, and the back flow phenomenon was suppressed, as compared with the case of using Liquid Sample 1 to 3 which had an Na ion content with respect to the total liquid amount of more than 10 ppm.

From the above results, it is indicated that in a dye composition containing a nonpolar solvent and a dye, by adjusting the Na ion content to 10 ppm or less, the voltage retention ratio and the responsiveness can be improved, and the back flow phenomenon can be suppressed.

The disclosure of Japanese Patent Application No. 2012-256675 filed on Nov. 22, 2012 is incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

The invention claimed is:

1. A method for manufacturing a dye composition for electrowetting display, the method comprising processing a mixture liquid containing a nonpolar solvent and a dye, using an ion exchange resin, to obtain a dye composition for electrowetting display.

2. The method for manufacturing a dye composition for electrowetting display according to claim 1, wherein the ion exchange resin is a cation exchange resin.

3. The method for manufacturing a dye composition for electrowetting display according to claim 1, wherein, in the processing, the mixture liquid is processed until a sodium ion content reaches 10 ppm or less with respect to the total amount of the mixture liquid.

4. The method for manufacturing a dye composition for electrowetting display according to claim 1, wherein the dye is at least one selected from the group consisting of an azomethine dye and a methine dye.

5. A dye composition for electrowetting display, the dye composition being obtained by processing a mixture liquid containing a nonpolar solvent and a dye, using an ion exchange resin.

6. The dye composition for electrowetting display according to claim 5, wherein the dye composition has a sodium ion content of 10 ppm or less with respect to the total amount of the dye composition.

7. The dye composition for electrowetting display according to claim 5, wherein the dye is at least one selected from the group consisting of an azomethine dye and a methine dye.

8. The dye composition for electrowetting display according to claim 5, wherein the dye composition has a voltage retention ratio of 70% or higher, when disposing the dye composition between two electrodes having an interelectrode distance of 8 μm and each having a size of 10 mm×10 mm and measuring the voltage retention ratio under conditions of an applied voltage pulse amplitude of 5 V, an applied voltage pulse frequency of 60 Hz, and an applied voltage pulse width of 16.7 msec.

* * * * *